(12) United States Patent
Verret et al.

(10) Patent No.: US 11,288,493 B2
(45) Date of Patent: Mar. 29, 2022

(54) POINT CLOUD REGISTRATION WITH ERROR PROPAGATION

(71) Applicant: Raytheon Company, Waltham, MA (US)

(72) Inventors: Jody D. Verret, Rockwall, TX (US); Corey J. Collard, Plano, TX (US)

(73) Assignee: Raytheon Company, Waltham, MA (US)

( * ) Notice: Subject to any disclaimer, the term of this patent is extended or adjusted under 35 U.S.C. 154(b) by 36 days.

(21) Appl. No.: 16/800,819

(22) Filed: Feb. 25, 2020

(65) Prior Publication Data

US 2021/0271854 A1 Sep. 2, 2021

(51) Int. Cl.
*G06T 7/33* (2017.01)
*G06K 9/00* (2022.01)
*G06T 15/20* (2011.01)

(52) U.S. Cl.
CPC ............ *G06K 9/00208* (2013.01); *G06T 7/33* (2017.01); *G06T 15/20* (2013.01);
(Continued)

(58) Field of Classification Search
CPC .... G06T 7/60; G06T 7/32; G06T 7/05; G06T 2207/10028; G06T 2207/10032; G06T 2207/20164; G06T 2207/30181; G06T 2207/20221; G06T 2207/20081; G06T 2207/30168; G06T 2200/04; G06T 2200/08; G06T 7/33; G06T 7/593; G06T 15/20; G06T 19/20; G06T 2219/2004; G06T 2219/2016; G06T 7/97; G06T 7/70; G06F 16/29; G06K 9/00208; G06K 9/0063; G06K 9/00201; G06K 9/00637; G06K 9/4642; G06K 2009/6213
See application file for complete search history.

(56) References Cited

U.S. PATENT DOCUMENTS 6,757,445 B1 * 6/2004 Knopp .................. G01C 11/06
382/154
7,310,440 B1 * 12/2007 Dolloff ................ G06K 9/0063
345/427
(Continued)

FOREIGN PATENT DOCUMENTS

TW 201839722 A 11/2018
TW 201915953 A 4/2019
TW 201928883 A 7/2019

OTHER PUBLICATIONS

"International Application Serial No. PCT/US2021/019397, International Search Report dated May 14, 2021", 5 pgs.
(Continued)

*Primary Examiner* — Ian L Lemieux
(74) *Attorney, Agent, or Firm* — Schwegman Lundberg & Woessner, P.A.

(57) ABSTRACT

Discussed herein are devices, systems, and methods for merging point cloud data with error propagation. A can include reducing a sum aggregate of discrepancies between respective tie points and associated 3D points in first and second 3D images, adjusting 3D error models of the first and second 3D images based on the reduced discrepancies to generate registered 3D images, and propagating an error of the first or second 3D images to the registered 3D image to generate error of the registered 3D images.

20 Claims, 4 Drawing Sheets

(52) U.S. Cl.
CPC ........... *G06T 2207/10028* (2013.01); *G06T 2207/20081* (2013.01); *G06T 2207/30168* (2013.01)

(56) References Cited

U.S. PATENT DOCUMENTS

| | | | |
|---|---|---|---|
| 9,245,201 B1 | 1/2016 | Jin et al. | |
| 9,947,128 B2* | 4/2018 | Korb | H04N 19/136 |
| 2003/0202701 A1* | 10/2003 | Schuler | G06T 7/33 |
| | | | 382/209 |
| 2009/0175498 A1* | 7/2009 | Kochi | G06T 7/74 |
| | | | 382/103 |
| 2014/0334686 A1* | 11/2014 | LaFarelle | G06T 7/246 |
| | | | 382/107 |
| 2015/0371431 A1* | 12/2015 | Korb | G06K 9/00208 |
| | | | 382/113 |
| 2016/0314593 A1* | 10/2016 | Metzler | G01C 15/002 |
| 2021/0019937 A1* | 1/2021 | Gallaway | G06T 15/06 |
| 2021/0097280 A1* | 4/2021 | Sharp, III | G06K 9/6202 |
| 2021/0256722 A1* | 8/2021 | Staab | G06T 7/593 |

OTHER PUBLICATIONS

"International Application Serial No. PCT/US2021/019397, Written Opinion dated May 14, 2021", 6 pgs.

Blasone, Giacomo, et al., "Monitoring sediment source areas in a debris-flow catchment using terrestrial laser scanning", Catena, Elsevier, Amsterdam, NL, vol. 123, (Jul. 28, 2014), 23-36.

Pritt, Mark D, et al., "Georegistration of motion imagery with error propagation", Full Motion Video (FMV) Workflows And Technologies For Intelligence, Surveillance, And Reconnaissance (ISR) And Situational Awareness, SPIE, (May 11, 2012).

Wang, Tiesheng, et al., "Research on registration method and precision in terrestrial 3D laser scanning", Proceedings of SPIE, IEEE, US, vol. 9808, (Dec. 9, 2015), 980800-980800.

Yu-Bin, Liang, et al., "Semiautomatic Registration of Terrestrial LaserScanning Data Using PerspectiveIntensity Images", IEEE Geoscience And Remote Sensing Letters, IEEE Service Center, New York, NY, US, vol. 14, No. 1, (Jan. 1, 2017), 28-32.

"Taiwanese Application Serial No. 110105974, First Office Action dated Dec. 30, 2021", with English translation, 20 pgs.

\* cited by examiner

POINT CLOUD REGISTRATION WITH ERROR PROPAGATION

GOVERNMENT RIGHTS

This invention was made with Government support under government contract HM047618C0039. The Government has certain rights in this invention.

TECHNICAL FIELD

Embodiments discussed herein regard devices, systems, and methods for merging three-dimensional (3D) point clouds. Error of the merged 3D point cloud can be bounded by errors of the individual 3D point clouds.

DETAILED DESCRIPTION

Discussed herein are methods, systems, and devices for registering a first 3D point cloud (or a portion thereof) to one or more other 3D point clouds (or a portion thereof) to generate a merged 3D point cloud. One or more the first and second 3D point clouds can include an associated error. The associated error can be propagated to the merged 3D point cloud. The error of the 3D point cloud can be used in a downstream application. Example applications include targeting and mensuration. A targeteer (one who performs targeting) can benefit from the error to better inform their targeting location choice. A mensuration of an object can benefit from the error as well.

The merged 3D point clouds can include error that is better than either of the first and second 3D point clouds individually. For example, if the first 3D point cloud includes a lower error (relative to the second 3D point cloud) in the x and y directions and the second 3D point cloud includes a lower error (relative to the first 3D point cloud) in the z direction, the merged 3D point cloud can include error bounded by the first 3D point cloud in the x and y directions and by the second 3D point cloud in the z direction. The merged point cloud can thus inherit the better of the errors between the first and second point clouds for a specified parameter.

Reference will now be made to the FIGS. to describe the methods, systems, and devices for merging 3D point clouds with error propagation.

Figure 1:
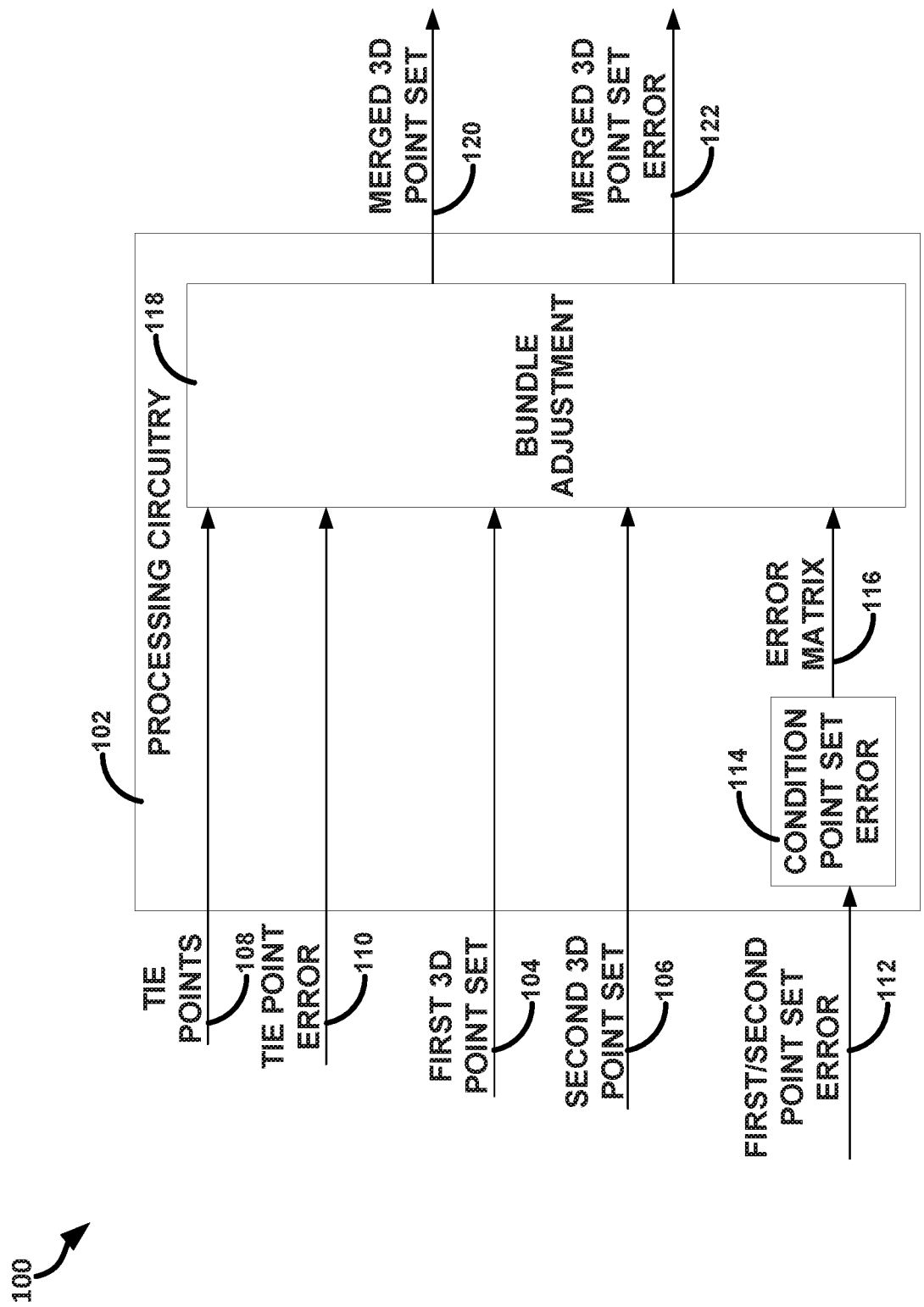
FIG. 1 illustrates an example of an embodiment of a system for 3D point set merging.

FIG. 1 illustrates an example of a system for 3D point set merging. The system can include processing circuitry 102 that receives tie points 108, tie point error 110, a first 3D point set 104, a second 3D point set 106, tie points 108, tie point error 110, and first or second point set error 112. The first or second point set error 112 includes error for at least one of the first 3D point set 104 and the second 3D point set 106. The first or second point set error 112 can thus include error for the first 3D point set 104, the second 3D point set 106, or the first 3D point set 104 and the second 3D point set 106.

The first 3D point set 104 or the second 3D point set 106 can include a point cloud, a 3D surface, or the like. The first 3D point set 104 and the second 3D point set 106 can include (x, y, z) data for respective geographic regions. The geographic regions of the first 3D point set 104 and the second 3D point set 106 at least partially overlap. One or more of the first point set 104 and the second point set 106 can include intensity data. Intensity data can include one or more intensity values, such as red, green, blue, yellow, black, white, gray, infrared, thermal, or the like. One or more of the first point set 104 and the second the point set 106 can include error data. The error data is illustrated as being a separate input in FIG. 1, namely the first or second point set error 112. The error data can indicate an accuracy of the corresponding point of the point set.

The tie points 108 can associate respective points between the first 3D point set 104 and the second 3D point set 106. The tie points 108 can indicate a first point $(x_1, y_1, z_1)$ in the first 3D point set 104, a second point $(x_2, y_2, z_2)$ in the second 3D point set 106 or an error associated with the tie point 108 (shown as separate input tie point error 110). The tie point error 110 can indicate how confident one is that the first and second points correspond to the same geographic location. The tie point error 110 can include nine entries indicating a covariance (variance or cross-covariance) between three variables. The three variables can be error in the respective directions (x, y, z). A covariance matrix representation of the tie point error 110 is provided as $$\begin{bmatrix} e_x & e_{xy} & e_{xz} \\ e_{yx} & e_y & e_{yz} \\ e_{zx} & e_{zy} & e_z \end{bmatrix}$$

where the diagonal terms are respective variances in the given directions, and the off-diagonal terms are covariances between the directions.

The first or second point set error 112 can sometimes be improved, such as to be more rigorous. Sometimes, the first or second point set error 112 can be in a form that is not digestible by the bundle adjustment operation 118. The point set error 112 can be conditioned by a condition point set error operation 114 to generate an error matrix 116. The condition point set error operation 114 can include generating a covariance matrix 116 of error parameters of the first 3D point set 104 or the second 3D point set 106. The error parameters can include seven parameters. Three of the parameters can include translation in x, y, and z, respectively. Three of the parameters can be for rotation in x, y, and z (roll, pitch, and yaw), respectively. One of the parameters can be for a scale factor between the first 3D point set 104 and the second 3D point set 106. An example of the matrix 116 produced by the condition point set error operation 114 is provided as $$\begin{bmatrix} \bar{x} & \bar{xy} & \bar{xz} & \bar{x\omega} & \bar{x\varphi} & \bar{x\kappa} & \bar{xs} \\ \bar{yx} & \bar{y} & \bar{yz} & \bar{y\omega} & \bar{y\varphi} & \bar{y\kappa} & \bar{ys} \\ \bar{zx} & \bar{zy} & \bar{z} & \bar{z\omega} & \bar{z\varphi} & \bar{z\kappa} & \bar{zs} \\ \omega\bar{x} & \omega\bar{y} & \omega\bar{z} & \omega & \omega\varphi & \omega\kappa & \omega s \\ \varphi\bar{x} & \varphi\bar{y} & \varphi\bar{z} & \varphi\omega & \varphi & \varphi\kappa & \varphi s \\ \kappa\bar{x} & \kappa\bar{y} & \kappa\bar{z} & \kappa\omega & \kappa\varphi & \kappa & \kappa s \\ s\bar{x} & s\bar{y} & s\bar{z} & s\omega & s\varphi & s\kappa & s \end{bmatrix}$$

where $\bar{x}$ is translation in x, $\bar{y}$ is translation in y, where $\bar{z}$ is translation in z, $\omega$ is roll, $\varphi$ is pitch, $\kappa$ is yaw, and s is scale.

The bundle adjustment operation 118 can receive the tie points 108, tie point error 110, first 3D point set 104, second 3D point set 106, and the error matrix 116 at input. The bundle adjustment operation 118 can produce a merged 3D point set 120 and a merged 3D point set error 122 as output. The bundle adjustment operation 118 can use a least squares estimator (LSE) for registration of the first 3D point set 104 and the second 3D point set 106. The operation 118 is easily extendable to merging more than two 3D data sets even though the description regards only two 3D data sets at times. The bundle adjustment operation 118 can use one or more photogrammetric techniques. The bundle adjustment operation 118 can include outlier rejection. The bundle adjustment operation 118 can determine error model parameters for the 3D data sets. Application of the error model parameters to the first 3D point set 104 and the second 3D point set 106, results in the relative alignment (registration) of the first 3D point set 104 and the second 3D point set 106.

Figure 2:
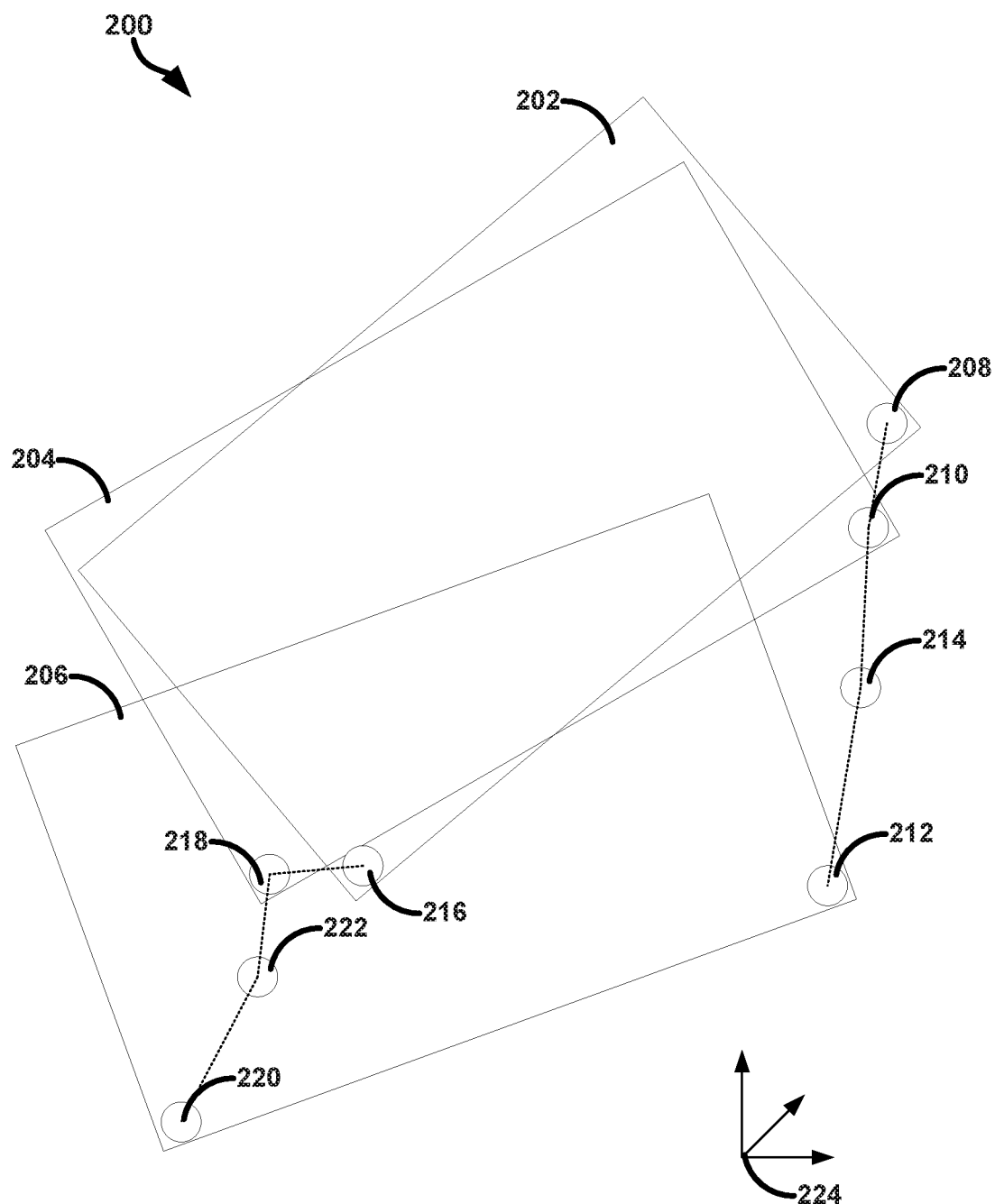
FIG. 2 illustrates an example diagram of an embodiment of the relationship between ground point coordinate estimates and the corresponding 3D data set observations.

FIG. 2 illustrates an example diagram of an embodiment of the relationship between ground point coordinate estimates $\hat{V}_j$ and the corresponding 3D data set observations $\bar{V}_{ij}$. In FIG. 2, three misregistered 3D data sets 202, 204, and 206 and a reference frame 224 are illustrated. First image observations 208, 210, 212 and a first associated ground point 214 and second image observations 216, 218, 220, and a second associated ground point 222 are illustrated. The ground point 214 can be determined using a least squares estimator. The least squares estimator can reduce (e.g., minimize) the discrepancy (across all observations and ground points) across all images. The least squares estimator can propagate an error in one or more of the 3D data sets to an error in a registered 3D data set.

This section establishes some preliminary notational conventions and symbol definitions used for developing the formulations for the bundle adjustment operation 118. The bundle adjustment operation 118 can include identifying a ground point that reduces a discrepancy between the ground point and corresponding points in respective images, and then adjusting points in the 3D data sets in a manner that reduces the discrepancy. The term "3D data set" is sometimes referred to as an "image". For convenience, example sizes of vectors and matrices are indicated below the symbol. Thus, the symbol $$\underset{N \times M}{A}$$

denotes a matrix A with N rows and M columns. Column vectors from $R^3$ thus have the annotation 3×1. Components of a vector V are written as $$\underset{3 \times 1}{V} = [x \ y \ z]^T.$$

If the vector includes diacritical marks or distinguishing embellishments, these are transferred to the components, as in $\bar{V} = [\bar{x} \ \bar{y} \ \bar{z}]^T$ and $V' = [x' \ y' \ z']^T$.

Equation modeling of the relationship between points in one 3D space to corresponding points in another 3D space is now described. A common reference space is established across all of the images. The reference space can be constructed to accommodate a simultaneous adjustment of more than two images. Correspondences can be formed between points in the reference space and the measured conjugate point locations in each image. The observation equation can be represented as Equation 1:

$$\underset{3 \times 1}{\tilde{V}} = (1+s) \underset{3 \times 3}{T} \left( \underset{3 \times 1}{\hat{V}} - \underset{3 \times 1}{\bar{V}} \right) \quad \text{Equation 1}$$

where $\hat{V}$ is a reference-space 3D coordinate, $\tilde{V}$ is the observation of $\hat{V}$ in an image and the orientation and offset relationship between reference space and image space is taken from the orientation matrix T and offset vector $\bar{V}$ using Equation 2:

$$T \equiv T(\omega, \phi, \kappa) = \begin{bmatrix} c\phi c\kappa & c\omega s\kappa + s\omega s\phi c\kappa & s\omega s\kappa - c\omega s\phi c\kappa \\ -c\phi s\kappa & c\omega c\kappa - s\omega s\phi s\kappa & s\omega c\kappa + c\omega s\phi s\kappa \\ s\phi & -s\omega c\phi & c\omega c\phi \end{bmatrix} \quad \text{Equation 2}$$

where the symbols "c" and "s" denote trigonometric cosine and sine functions, respectively. The quantities $$\underset{3 \times 1}{\theta} \equiv [\omega \ \phi \ \kappa]^T$$

refer to rotation angles (roll, pitch and yaw) about an image's x, y, and z axes respectively. The scalar s represents an isometric scale correction factor (nominally zero). The above form is conducive to modeling a simultaneous least squares adjustment of all images' offsets and orientations, provided that estimates of reference space coordinates for all conjugate image observations vectors are available. This form is more suitable and flexible than explicitly holding a single image as a reference for at least one of several reasons: (1) there are reference space ground coordinates that permit the potential use of ground control points, whose a priori covariances are relatively small (e.g., they carry high weighting in the solution); (2) the above formulation is suitable for a simultaneous adjustment for data that includes small or minimal overlap (mosaics), as well as, many images collected over the same area (stares) or any combination in between; and (3) allowing all images to adjust simultaneously provides improved geolocation accuracy of the post-adjusted and merged images. parameters.

The symbol $\hat{V}$ will be referred to as a ground point (akin to tie point ground locations and ground control point locations in a classical photogrammetric image adjustment). The symbol $\tilde{V}$ will be referred to as a ground point observation (akin to image tie point observation locations in a classical photogrammetric image adjustment).

Unlike the classical photogrammetric treatment, $\hat{V}$ and $\tilde{V}$ are both "on the ground" in the sense that they both represent ground coordinates in 3D (in the classical imagery case, the observations are in image space and are thus 2D coordinates). Further, the point may very well not be "on the ground" but could be on a building rooftop, treetop canopy, etc. However, the terminology "ground point" and "ground point observation" will be used.

If j is taken to be the index of an arbitrary ground point and i to be the index of an arbitrary image, the observation equation (Equation 1) can be written as Equation 3

$$\tilde{V}_{ij} = (1+s_i)T_i(\hat{V}_j - \overline{V}_i) \qquad \text{Equation 3}$$

where $\hat{V}_j \equiv [\hat{x}_j \ \hat{y}_j \ \hat{z}_j]^T$ as the $j^{th}$ ground point, $\overline{V}_i \equiv [\overline{x}_i \ \overline{y}_i \ \overline{z}_i]T$ as the offset vector between image i and the reference space origin, and where $$T_i \equiv T(\omega_i, \phi_i, \kappa_i) = \begin{bmatrix} c\phi_i c\kappa_i & c\omega_i s\kappa_i + s\omega_i s\phi_i c\kappa_i & s\omega_i s\kappa_i - c\omega_i s\phi_i c\kappa_i \\ -c\phi_i s\kappa_i & c\omega_i c\kappa_i - s\omega_i s\phi_i s\kappa_i & s\omega_i c\kappa_i + c\omega_i s\phi_i s\kappa_i \\ s\phi_i & -s\omega_i c\phi_i & c\omega_i c\phi_i \end{bmatrix} \qquad \text{Equation 4}$$

is the orientation matrix between image i and the reference space frame and where $s_i$ is image i scale correction factor. Thus, $\hat{V}_{ij}$ is the coordinate of the $i^{th}$ image's observation of ground point j.

If a particular ground point is found in two or more images, it can serve as a point which ties the images together (one of the tie points 108). These are generically referred to as tie points. A single tie point is often referred to as a collection of image observations (with coordinates) of the same point on the ground along with the corresponding ground point (with coordinates).

Since the observations over many images i are the measurements containing error, the true ground point coordinates are generally unknown. To facilitate this, an initial estimate of the ground point location can be computed. The initial estimate is provided as Equation 5 as the average of the 3D observations $$\hat{V}_j^{(0)} \equiv \frac{1}{|I_j|} \sum_{i \in I_j} \tilde{V}_{ij}^R \qquad \text{Equation 5}$$

The ground points themselves are treated as derived (but unconstrained) observations and allowed to adjust in performance of the operation 118. There can be an observation of interest whose true ground coordinates are well known. These are classically called ground control points (or GCPs). Since this development can accommodate both GCPs and tie points, the more general terms of "ground point" and "ground point observation" are sometimes used (as contrasted with "tie point ground coordinate" and "tie point observation").

The bundle adjustment operation 118 can operate on two or more images taken over a same area (with observations for tie points, sometimes called a stare scenario); two or more images taken in strips (forming a mosaic of data, with 2-way, 3-way, or m-way observations in strip overlap regions); tie points in which the corresponding ground points may appear in two or more images, incorporation of GCPs for features in imagery, providing an absolute registration; accommodation of a full covariance for tie point observations. This is conducive for tie point correlation techniques which are highly asymmetrical (e.g., as long as the asymmetry can be characterized as a measurement covariance).

The relationship between ground point coordinate estimates $\hat{V}_j$ and the corresponding image observations $\hat{V}_{ij}$ can be understood as a stare scenario between three misregistered images.

For the development of the LSE formulation (and associated preprocessing) that can be performed by the bundle adjustment operation 118, more definitions are provided in Table 1.

TABLE 1

Definitions of Symbols

| Symbol | Definition |
|---|---|
| $V_R^W$ <br> $3 \times 1$ | Location of the origin of the reference frame with respect to the world frame. This is thus the location of the reference frame coordinatized in the world-frame. |
| $\overline{V}_i$ <br> $3 \times 1$ | Translation of $i^{th}$ image with respect to reference frame origin. <br> $\overline{V}_i \equiv [\overline{x}_i \ \overline{y}_i \ \overline{z}_i]^T$ |
| $\theta_i$ <br> $3 \times 1$ | Orientation angles of $i^{th}$ image with respect to image frame origin <br> $\theta_i \equiv [\omega_i \ \phi_i \ \kappa_i]^T$ |
| $s_i$ <br> $1 \times 1$ | Isometric scale factor correction for the $i^{th}$ image. |
| $\overline{V}_i^{(0)}$ <br> $3 \times 1$ | Initial (zeroth-iteration) value for $\overline{V}_i$, thus assumed to be with respect to reference frame origin. |
| $\theta_i^{(0)}$ <br> $3 \times 1$ | Initial (zeroth-iteration) value for $\theta_i$. Each element is taken to be zero. |
| $s_i^{(0)}$ <br> $1 \times 1$ | Initial (zeroth iteration) value for $s_i$. Nominally $s_i^{(0)} \equiv 0$. |
| $T_i$ <br> $3 \times 3$ | Orientation matrix for $i^{th}$ image built from $\theta_i$ |
| $\hat{V}_j$ <br> $3 \times 1$ | Ground point coordinates for ground point j with respect to the reference frame origin <br> $\hat{V}_j \equiv [\hat{x}_j \ \hat{y}_j \ \hat{z}_j]^T$ |

TABLE 1-continued

Definitions of Symbols

| Symbol | Definition |
|---|---|
| $\hat{V}_j^{(0)}$ <br> 3×1 | Initial (zeroth-iteration) estimated value for $\hat{V}_j$ |
| $\tilde{V}_{ij}^W$ <br> 3×1 | Ground point observation coordinate of ground point j on image i coordinatized in the world frame (e.g., these are UTM coordinates of the ground point observation location). |
| $\tilde{V}_{ij}$ <br> 3×1 | Ground point observation coordinate of ground point j on image i. These are implicitly assumed to be coordinatized in the local image frame for image i. $\tilde{V}_{ij} \equiv [\tilde{x}_{ij} \quad \tilde{y}_{ij} \quad \tilde{z}_{ij}]^T$ |
| $\dot{\Sigma}_i$ <br> 7×7 | A priori covariance of $i^{th}$ image translation, orientation and scale correction parameter vector |
| $\dot{W}_i$ <br> 7×7 | A priori parameter weight matrix for image i. $\dot{W}_i = \dot{\Sigma}_i^{-1}$ |
| $\ddot{\Sigma}_j$ <br> 3×3 | A priori covariance of ground point j |
| $\ddot{W}_j$ <br> 3×3 | A priori weight matrix for ground point j. $\ddot{W}_j = \ddot{\Sigma}_j^{-1}$ |
| $\tilde{\Sigma}_{ij}$ <br> 3×3 | A priori covariance for observation of ground point j upon image i |
| $\tilde{W}_{ij}$ <br> 3×3 | A priori observation weight matrix for observation of ground point j upon image i. $\tilde{W}_{ij} = (\tilde{\Sigma}_{ij})^{-1}$ |

General Indexing

| | |
|---|---|
| m | Number of images |
| i | Image index. $i \in \{1, 2, \ldots, m\}$ |
| n | Total number of ground points |
| j | Ground point index $j \in \{1, 2, \ldots, n\}$ |
| q | Total number of ground point observations |
| b | Ground point observation index $b \in \{1, 2, \ldots, q\}$ |
| (p) | Non-linear least squares iteration index |
| $G_i$ | The index set of all ground points appearing in image i. Thus $G_i \subseteq \{1, 2, \ldots, n\}$ |
| $O_j$ | The index set of observations of ground point j over all images. Thus $O_j \subseteq \{1, 2, \ldots, q\}$ |
| $I_j$ | The index set of images upon which ground point j is an observation. Thus $I_j \subseteq \{1, 2, \ldots, m\}$ |
| $M_b^G$ | Mapping of observation index to Ground point index. $M_b^G$ gives the ground point index ($\in \{1, 2, \ldots, n\}$) for a specified observation index $b \in \{1, 2, \ldots, q\}$. |
| \|S\| | Cardinality of set S (e.g., the number of index elements in set S). |

Ground point observations can be indexed by ground point j and image i (as in $\tilde{V}_{ij}$) or by linear indexing, b (as in $\tilde{V}_b$). Use of the subscripting depends upon the context. In the former, it is of interest to characterize the fact that a particular ground point j appears on a particular image i. In the latter, it is of interest to enumerate all observations independent of to which image or to which ground point they refer.

Since some 3D point set data is presented in a "world" space coordinate system (e.g., Universal Transverse Mercator (UTM) map projection) and since the observation Equation 3 is image dependent, some coordinate frame definitions and transformations can aid understanding.

If it is assumed that ground point observation locations are specified in world coordinates, it is of interest to transform the ground point observation locations to be "image" relative. Further, it can be of interest to obtain the ground locations and image offsets themselves to be relative to a "local" reference coordinate frame.

A motivation for a local reference coordinate frame can be to remove large values from the coordinates. For example, UTM coordinates can typically be in the hundreds of thousands of meters. This makes interpretation of the coordinates more difficult, for example, when examining a report of updated coordinate locations. A motivation for an image-relative coordinate frame can be so that the interpretation of the orientation angles comprising the $T_i$ matrices can be relative to the center of the data set. This is contrasted with the origin of rotation being far removed from the data set (e.g., coincident with the local reference frame origin in the mosaic scenario).

In both cases, the transformations between coordinate frames simply involve a 3D translation. The mnemonics W, R and I are used to denote the "world", "reference" and "image" coordinate frames, respectively. To facilitate the transformations, the following convention is established. A superscript on a vector denotes the coordinate frame to which it is referred. Thus $\tilde{V}_{ij}^{W}$ corresponds to the world space coordinates of a particular tie point observation, while $\tilde{V}_{ij}^{R}$ and $\tilde{V}_{ij}^{I}$ represent the same tie point observation but referred to the reference frame and image frame, respectively.

Following the above convention, the symbol can $V_A^B$ represent "the location of the origin of frame A coordinatized in frame B". Thus, $V_R^V$ can represent the location of the reference frame in the world coordinate system (e.g., UTM coordinates of the origin of the reference frame). The relationship between an arbitrary vector $V^R$ coordinatized in the reference frame and the same vector $V^W$ coordinatized in the world frame can be represented by Equation 6

$$V^W = V^R + V_R^W \qquad \text{Equation 6}$$

The reference frame can be established as an average of all of the world-space coordinates of tie points. This offset (denoted $V_R^W$) can be determined using Equation 7

$$V_R^W = \frac{1}{q}\sum_{b=1}^{q} \tilde{V}_b^W \qquad \text{Equation 7}$$

For simplicity, it can be assumed that the reference frame origin, referred to by the world frame, can be computed by a process external to the bundle adjustment operation 118 (e.g., by the process that assembles the tie points 108 for use in the bundle adjustment operation 118).

The image frame (e.g., a frame defined on a per-image basis) can be the world coordinates of the center of an image. Under the assumption that there are bounding coordinates in the image data (specifying the min and max extents of the data in world-frame X, Y and Z), the center of the data can thus be taken to be the respective averages of the min and max extents. Since this image frame refers to world space, the computed offset is denoted $V_I^W$. If bounding coordinates are not available, value for $V_I^W$ is taken as the average of the tie point locations over the specific image i, as described in Equation 8

$$V_I^W = \frac{1}{|G_i|} \sum_{j \in G_i} \tilde{V}_{ij} \qquad \text{Equation 8}$$

The image frame offset in reference space coordinates is taken to be the initial value for $\overline{V}^{(0)}$ on a per image basis. Thus, for each image i, an external process can compute reference frame coordinates according to Equation 9)

$$\overline{V}_i^{(0)R} = V_I^W - V_R^W \qquad \text{Equation 9}$$

Since the tie point observation values can be input in world coordinates and since the observation equation domain assumes reference frame coordinates, some preprocessing of the input data can help make it consistent with that assumed by the observation equation (Equations 1 or 3). The tie point observation coordinates can be converted from world space to reference space. This can be performed for each observation per Equation 10.

$$\tilde{V}_{ij}^R = \tilde{V}_{ij}^W - V_R^W \qquad \text{Equation 10}$$

Next, since the true ground point coordinates used in Equation 3 can be unknown, they can be estimated. The ground point coordinates can be assumed to be coordinatized in the reference frame. The initial estimated values for the ground coordinates of each tie point can be computed as an average of the ground point observations over all images in which it appears as described by Equation 11

$$\hat{V}_j^{(0)} \equiv \frac{1}{|I_j|} \sum_{i \in I_j} \tilde{V}_{ij}^R \qquad \text{Equation 11}$$

Since the true locations of the tie point ground coordinates can be treated as unknown, the a priori covariance can reflect this by treating the errors in the ground coordinates as numerically unconstrained (in units of meters squared) as described by Equation 12

$$\hat{\Sigma}_j = \text{diag}([10^{12} \, 10^{12} \, 10^{12}]) \qquad \text{Equation 12}$$

The tie point observation coordinates for use in the observation equation can be converted to image-relative coordinates using Equation 13.

$$\tilde{V}_{ij} = \tilde{V}_{ij}^R - \overline{V}_i^{(0)} \qquad \text{Equation 13}$$

Next, a least squares formulation and solution are discussed. Since the observation equation, Equation 1 or 3, is non-linear in the orientation angles that form $T_i$, the least squares problem becomes a non-linear least squares problem. Equation 3 can be linearized. Solving the linearized equation can be a multidimensional root finding problem (in which the root is the vector of solution parameters).

For simplification in notation of the linearization, consider a fixed image and a fixed ground point. Let the unknown error model parameters (offset, orientation, and scale correction) be represented by Equation 14:

$$X_{7\times 1} = [\bar{x} \ \bar{y} \ \bar{z} \ \omega \ \varphi \ \kappa_S]^T \qquad \text{Equation 14}$$

The observation equation for ground point observation V can be written as Equation 15

$$\tilde{V} = (1+s)T(\hat{V}-\overline{V}) \qquad \text{Equation 15}$$

where T is the true image orientation matrix, $\overline{V}$ is the true image translation vector, $\hat{V}$ is the true ground point coordinate and $\tilde{V}$ is the corresponding ground point observation coordinate.

If one wishes to include the ground point coordinates $\hat{V}$ as additional observations, the solution for X and $\hat{V}$ can be cast as a root solving problem based on Equation 16

$$F(X;\hat{V}) = 0 \qquad \text{Equation 16}$$

where $$F(X;\hat{V}) = \tilde{V} - (1+s)T(\hat{V}-\overline{V}) \qquad \text{Equation 17}$$

In vector form, the function, F, can be represented by Equation 18

$$\begin{bmatrix} f_1 \\ f_2 \\ f_3 \end{bmatrix} = \begin{bmatrix} \tilde{x} \\ \tilde{y} \\ \tilde{z} \end{bmatrix} - (1+s)T\left(\begin{bmatrix} \hat{x} \\ \hat{y} \\ \hat{z} \end{bmatrix} - \begin{bmatrix} \bar{x} \\ \bar{y} \\ \bar{z} \end{bmatrix}\right) \qquad \text{Equation 18}$$

The function F can be approximated using a first-order Taylor series expansion of F about initial estimates $X^{(0)}$ and $\hat{V}^{(0)}$ as in Equation 19

$$0 = F(X;\hat{V}) \approx F(X^{(0)};\hat{V}^{(0)}) + \frac{\partial F^{(0)}}{\partial X}\dot{\Delta} + \frac{\partial F^{(0)}}{\partial \hat{V}}\ddot{\Delta} \qquad \text{Equation 19}$$

where $X^{(0)}$ is an initial approximation of X, $\hat{V}^{(0)}$ is an initial approximation of $\hat{V}$, the Jacobians $$\frac{\partial F^{(0)}}{\partial X} \text{ and } \frac{\partial F^{(0)}}{\partial \hat{V}}$$

are the partial derivatives of F evaluated at $X^{(0)}$ and $\hat{V}^{(0)}$ respectively, $\dot{\Delta} = [\Delta \bar{x}\ \Delta \bar{y}\ \Delta \bar{z}\ \Delta \omega\ \Delta \varphi\ \Delta \kappa\ \Delta S]^T$ is a vector of corrections to X, $\ddot{\Delta} = [\Delta \hat{x}\ \Delta \hat{y}\ \Delta \hat{z}]$ is a vector of corrections to $\hat{V}$. The values for $X^{(0)}$ and $\hat{V}^{(0)}$ are discussed in Table 1

The Jacobians can be written as Equations 20 and 21

$$\underset{3\times 7}{\dot{B}} \equiv \frac{\partial F}{\partial X} = \begin{bmatrix}\frac{\partial f_1}{\partial X}\\ \frac{\partial f_2}{\partial X}\\ \frac{\partial f_3}{\partial X}\end{bmatrix} = \begin{bmatrix}\frac{\partial f_1}{\partial \bar{x}} & \frac{\partial f_1}{\partial \bar{y}} & \frac{\partial f_1}{\partial \bar{z}} & \frac{\partial f_1}{\partial \omega} & \frac{\partial f_1}{\partial \varphi} & \frac{\partial f_1}{\partial \kappa} & \frac{\partial f_1}{\partial s}\\ \frac{\partial f_2}{\partial \bar{x}} & \frac{\partial f_2}{\partial \bar{y}} & \frac{\partial f_2}{\partial \bar{z}} & \frac{\partial f_2}{\partial \omega} & \frac{\partial f_2}{\partial \varphi} & \frac{\partial f_2}{\partial \kappa} & \frac{\partial f_2}{\partial s}\\ \frac{\partial f_3}{\partial \bar{x}} & \frac{\partial f_3}{\partial \bar{y}} & \frac{\partial f_3}{\partial \bar{z}} & \frac{\partial f_3}{\partial \omega} & \frac{\partial f_3}{\partial \varphi} & \frac{\partial f_3}{\partial \kappa} & \frac{\partial f_3}{\partial s}\end{bmatrix} \qquad \text{Equation 20}$$

$$\underset{3\times 3}{\ddot{B}} \equiv \frac{\partial F}{\partial \hat{V}} = \begin{bmatrix}\frac{\partial f_1}{\partial \hat{V}}\\ \frac{\partial f_2}{\partial \hat{V}}\\ \frac{\partial f_3}{\partial \hat{V}}\end{bmatrix} = \begin{bmatrix}\frac{\partial f_1}{\partial \hat{x}} & \frac{\partial f_1}{\partial \hat{y}} & \frac{\partial f_1}{\partial \hat{z}}\\ \frac{\partial f_2}{\partial \hat{x}} & \frac{\partial f_2}{\partial \hat{y}} & \frac{\partial f_2}{\partial \hat{z}}\\ \frac{\partial f_3}{\partial \hat{x}} & \frac{\partial f_3}{\partial \hat{y}} & \frac{\partial f_3}{\partial \hat{z}}\end{bmatrix} \qquad \text{Equation 21}$$

Note that the dot symbols are merely notations, following the classical photogrammetric equivalent, and do not intrinsically indicate "rates," as is sometimes denoted in other classical physics contexts.

In matrix notation, Equation 19 can be written as $$\begin{bmatrix}\frac{\partial F^{(0)}}{\partial X} & \frac{\partial F^{(0)}}{\partial \hat{V}}\end{bmatrix}\begin{bmatrix}\dot{\Delta}\\ \ddot{\Delta}\end{bmatrix} = -F(X^{(0)};\hat{V}^{(0)}) \text{ or} \qquad \text{Equation 22}$$

$$\begin{bmatrix}\underset{3\times 7}{\dot{B}} & \underset{3\times 3}{\ddot{B}}\end{bmatrix}\begin{bmatrix}\underset{7\times 1}{\dot{\Delta}}\\ \underset{3\times 1}{\ddot{\Delta}}\end{bmatrix} = \underset{3\times 1}{\varepsilon} \qquad \text{Equation 23}$$

Since the problem is nonlinear, the estimation of the parameter vector can be iterated (via a multi-dimensional extension of the Newton-Raphson method for root finding, or other technique). The solution can include relinearization at each iteration. The relinearization can be performed about the most recent estimate of the parameter vector. The linearized form of Equation 22 at iteration (p) can be represented as in Equation 24.

$$F(X;V) \approx F(X^{(p)};\hat{V}^{(p)}) + \frac{\partial F^{(p)}}{\partial X}\dot{\Delta} + \frac{\partial F^{(p)}}{\partial \hat{V}}\ddot{\Delta} \qquad \text{Equation 24}$$

where $X^{(p)}$ is the $p^{th}$ iteration estimate of the parameter vector X, $\hat{V}^{(p)}$ is the $p^{th}$ iteration estimate of $\hat{V}$, $$\frac{\partial F^{(p)}}{\partial X}$$

is the Jacobian of F with respect to X evaluated at $X^{(p)}$, $$\frac{\partial F^{(p)}}{\partial \hat{V}}$$

is the Jacobian of F with respect to $\hat{V}$ evaluated at $\hat{V}^{(p)}$, $\dot{\Delta}$ is a vector of corrections to X for the $p^{th}$ iteration, and $\ddot{\Delta}$ is a vector of corrections to $\hat{V}$ for the $p^{th}$ iteration.

With each iteration, the parameter and ground point vectors can be updated with the most recent correction as in Equations 25 and 26.

$$X^{(p)} = X^{(p-1)} + \dot{\Delta} \qquad \text{Equation 25}$$

$$\hat{V}^{(p)} = \hat{V}^{(p-1)} + \ddot{\Delta} \qquad \text{Equation 26}$$

For the initial iteration, initial values for $X^{(0)}$ and $\hat{V}^{(0)}$ can be estimated as discussed previously. The system represented by Equation 24 is now linear in $\dot{\Delta}$ and $\ddot{\Delta}$. A linear solver can be used to solve for the parameters.

For a particular image i and a particular ground point j, Equation 23 can be written as Equation 27

$$\begin{bmatrix}\underset{3\times 7}{\dot{B}_{ij}} & \underset{3\times 3}{\ddot{B}_{ij}}\end{bmatrix}\begin{bmatrix}\underset{7\times 1}{\dot{\Delta}_i}\\ \underset{3\times 1}{\ddot{\Delta}_j}\end{bmatrix} = \underset{3\times 1}{\varepsilon_{ij}} \qquad \text{Equation 27}$$

The discrepancy vector for the $p^{th}$ iteration is thus be represented as in Equation 28

$$\varepsilon_{ij}^{(p)} = -F(X^{(p)};\hat{V}^{(p)}) \qquad \text{Equation 28}$$

and thus $$\varepsilon_{ij}^{(p)} = -[\tilde{V}_{ij} - (1+s_i)T_i(\hat{V}_j - \overline{V}_i)] \qquad \text{Equation 29}$$

To accommodate a simultaneous solution of all images and ground points, Equation 27 can be extended as $$\begin{bmatrix}\dot{B}_{11} & 0 & \cdots & 0 & \ddot{B}_{11} & 0 & \cdots & 0\\ \dot{B}_{12} & 0 & \cdots & 0 & 0 & \ddot{B}_{12} & \cdots & 0\\ \vdots & \vdots & \vdots & 0 & \vdots & \vdots & \ddots & 0\\ 0 & \dot{B}_{21} & \cdots & 0 & \ddot{B}_{21} & 0 & \vdots & 0\\ \vdots & \vdots & \vdots & 0 & \vdots & \vdots & \vdots & \vdots\\ 0 & 0 & \cdots & \dot{B}_{mn} & 0 & 0 & \cdots & \ddot{B}_{mn}\end{bmatrix}\begin{bmatrix}\dot{\Delta}_1\\ \dot{\Delta}_2\\ \vdots\\ \dot{\Delta}_m\\ \ddot{\Delta}_1\\ \ddot{\Delta}_2\\ \vdots\\ \ddot{\Delta}_n\end{bmatrix} = \begin{bmatrix}\varepsilon_{11}\\ \varepsilon_{12}\\ \vdots\\ \varepsilon_{21}\\ \vdots\\ \varepsilon_{mn}\end{bmatrix} \qquad \text{Equation 30}$$

Equation 30 can be re-written as Equation 31

$$B\Delta = E \qquad \text{Equation 31}$$

then the normal equation matrix can be represented as Equation 32 or Equation 33

$$(B^T B)\Delta = B^T E \qquad \text{Equation 32}$$

$$Z\Delta = H \qquad \text{Equation 33}$$

It can be less efficient to form B as in Equation 30, for one or more of the following reasons: (1) B is very sparse; (2) the quantities $\dot{B}_{ij}$ and $\ddot{B}_{ij}$ are nonzero if and only if ground point j is observed on image i. For this reason, the classical development of the normal matrix $B^T B$ and right-hand side vector $B^T E$ uses summations over the appropriate indexing. These summations are provided in the normal matrix partitioning below.

The foregoing equations form a foundation for the present problem that is sufficient for development of the normal equations, examination of the normal matrix structure and formulation of the normal equation solution.

The normal equation can be written as in Equation 34

$$Z\Delta = H \qquad \text{Equation 34}$$

The matrices can be partitioned as in Equations 35-37

$$Z = \begin{bmatrix} \dot{N} + \dot{W} & \overline{N} \\ \overline{N}^T & \ddot{N} + \ddot{W} \end{bmatrix} \qquad \text{Equation 35}$$

$$\Delta = \begin{bmatrix} \dot{\Delta} \\ \ddot{\Delta} \end{bmatrix} \qquad \text{Equation 36}$$

$$H = \begin{bmatrix} \dot{K} \\ \ddot{K} \end{bmatrix} - \begin{bmatrix} \dot{W}\dot{C} \\ \ddot{W}\ddot{C} \end{bmatrix} \qquad \text{Equation 37}$$

The quantities $\dot{K}, \ddot{K}, \dot{C}$ and $\ddot{C}$ are described in more details elsewhere herein.

Combining Equations 35, 36 and 37 yields Equation 38

$$Z = \begin{bmatrix} \dot{N} + \dot{W} & \overline{N} \\ \overline{N}^T & \ddot{N} + \ddot{W} \end{bmatrix} \begin{bmatrix} \dot{\Delta} \\ \ddot{\Delta} \end{bmatrix} = \begin{bmatrix} \dot{K} \\ \ddot{K} \end{bmatrix} - \begin{bmatrix} \dot{W}\dot{C} \\ \ddot{W}\ddot{C} \end{bmatrix} \qquad \text{Equation 38}$$

The matrix Z can thus be represented as Equation 39

$$Z = N + W = \begin{bmatrix} \dot{N}_{7m \times 7m} & \overline{N}_{7m \times 3n} \\ \overline{N}^T_{3n \times 6m} & \ddot{N}_{3n \times 3n} \end{bmatrix} + \begin{bmatrix} \dot{W}_{7m \times 7m} & 0 \\ 0 & \ddot{W}_{3n \times 3n} \end{bmatrix} \qquad \text{Equation 39}$$

The matrix $\dot{N}$ can be written as Equation 40

$$\dot{N}_{7m \times 7m} = \begin{bmatrix} \dot{N}_1{}_{7 \times 7} & 0 & \cdots & 0 \\ 0 & \dot{N}_2{}_{7 \times 7} & \cdots & 0 \\ \vdots & \vdots & \ddots & \vdots \\ 0 & 0 & \cdots & \dot{N}_m{}_{7 \times 7} \end{bmatrix} \qquad \text{Equation 40}$$

and analogously $\dot{W}$ can be written as Equation 41

$$\dot{W}_{7m \times 7m} = \begin{bmatrix} \dot{W}_1{}_{7 \times 7} & 0 & \cdots & 0 \\ 0 & \dot{W}_2{}_{7 \times 7} & \cdots & 0 \\ \vdots & \vdots & \ddots & \vdots \\ 0 & 0 & \cdots & \dot{W}_m{}_{7 \times 7} \end{bmatrix} \qquad \text{Equation 41}$$

The block entries of $\dot{N}_i$ can be defined as in Equation 42

$$\dot{N}_i{}_{7 \times 7} = \sum_{j \in G_i} \dot{B}_{ij}^T \tilde{W}_{ij} \dot{B}_{ij} \qquad \text{Equation 42}$$

The subscripts ij on the $\dot{B}_{ij}$ matrices indicate that they are a function of image i and ground point j.

The matrix N can be expanded as in Equation 43

$$\ddot{N}_{3n \times 3n} = \begin{bmatrix} \ddot{N}_1{}_{3 \times 3} & 0 & \cdots & 0 \\ 0 & \ddot{N}_2{}_{3 \times 3} & \cdots & 0 \\ \vdots & \vdots & \ddots & \vdots \\ 0 & 0 & \cdots & \ddot{N}_n{}_{3 \times 3} \end{bmatrix} \qquad \text{Equation 43}$$

$\ddot{W}$ can be expanded as in Equation 44:

$$\ddot{W}_{3n \times 3n} = \begin{bmatrix} \ddot{W}_1{}_{3 \times 3} & 0 & \cdots & 0 \\ 0 & \ddot{W}_2{}_{3 \times 3} & \cdots & 0 \\ \vdots & \vdots & \ddots & \vdots \\ 0 & 0 & \cdots & \ddot{W}_n{}_{3 \times 3} \end{bmatrix} \qquad \text{Equation 44}$$

The block entries of Equation 43 can be defined as in Equation 45

$$\ddot{N}_i{}_{3 \times 3} = \sum_{i \in O_j} \ddot{B}_{ij}^T \tilde{W}_{ij} \ddot{B}_{ij} \qquad \text{Equation 45}$$

The matrix $\overline{N}$ from Equation 39 can be expanded as in Equation 46

$$\overline{N}_{7m \times 3n} = \begin{bmatrix} \overline{N}_{11}{}_{7 \times 3} & \overline{N}_{12}{}_{7 \times 3} & \cdots & \overline{N}_{1n}{}_{7 \times 3} \\ \overline{N}_{21}{}_{7 \times 3} & \overline{N}_{22}{}_{7 \times 3} & \cdots & \overline{N}_{2n}{}_{7 \times 3} \\ \vdots & \vdots & \ddots & \vdots \\ \overline{N}_{m1}{}_{7 \times 3} & \overline{N}_{m2}{}_{7 \times 3} & \cdots & \overline{N}_{mn}{}_{7 \times 3} \end{bmatrix} \qquad \text{Equation 46}$$

The block entries of N from Equation 45 can be defined as in Equation 47

$$\underset{7\times 3}{\bar{N}_{ij}} = \dot{B}_{ij}^T \tilde{W}_{ij} \ddot{B}_{ij} \, i \in \{1, \ldots, m\},$$
$$j \in \{1, \ldots, n\}$$

Equation 47

In a similar development the right hand side matrix H from Equation 34 can be expanded as in Equation 48

$$H = \begin{bmatrix} \dot{K}_1 \\ \dot{K}_2 \\ \vdots \\ \dot{K}_m \\ \ddot{K}_1 \\ \ddot{K}_2 \\ \vdots \\ \ddot{K}_n \end{bmatrix} - \begin{bmatrix} \dot{W} & 0 \\ 0 & \ddot{W} \end{bmatrix} \begin{bmatrix} \dot{C} \\ \ddot{C} \end{bmatrix}$$

Equation 48

The subblocks of H can be defined as in Equations 49 and 50

$$\underset{7\times 1}{\dot{K}_i} = \sum_{j \in G_i} \dot{B}_{ij}^T \tilde{W}_{ij} \varepsilon_{ij}$$

Equation 49

$$\underset{3\times 1}{\ddot{K}_j} = \sum_{i \in O_j} \ddot{B}_{ij}^T \tilde{W}_{ij} \varepsilon_{ij}$$

Equation 50 with the discrepancy vector $\varepsilon_{ij}$ defined as in Equation 29 and with $$\dot{C}^{(p)} = \dot{C}^{(p-1)} - \dot{C}^{(0)}$$ Equation 51

$$\ddot{C}^{(p)} = \ddot{C}^{(p-1)} - \ddot{C}^{(0)}$$ Equation 52

The values for $\dot{C}^{(0)}$ and $\ddot{C}^{(0)}$ are the initial parameter values. The initial values for the translation parameters portion of $\dot{C}^{(0)}$ can be taken to be the $\nabla_i^{(0)R}$ as computed in Equation 9. The initial values for the rotation parameters portion of $\dot{C}^{(0)}$ can be taken to be zero.

The initial values of $\ddot{C}^{(0)}$ can be taken to be the values of the ground point coordinates $\hat{V}_j^{(0)}$ as computed in accord with Equation 11.

The solution to the normal equation matrix on iteration (p) can be determined as in Equation 53

$$\Delta^{(p)} = Z^{-1} H$$ Equation 53

At each iteration, the parameters can be updated via Equations 51 and Equation 52 and the normal matrix can be formed and solved again. The process can continue until the solution converges. Examples of the convergence criterion can be discussed in the following section.

Since the solution is iterated, a convergence criterion can be established. An example of a convergence criterion is to compute the root-mean-square (RMS) of the residuals as in Equation 54

$$R^{(p)} = \sqrt{\frac{\varepsilon^T \varepsilon}{q - 7m}}$$

Equation 54

The value in the denominator of Equation 54 represents the number of degrees of freedom (e.g., the number of observation equations minus the number of estimated parameters).

Since typically q>>7m Equation 54 can be estimated as in Equation 55

$$R^{(p)} = \sqrt{\frac{\varepsilon^T \varepsilon}{q}}$$

Equation 55

The condition q>>7m can be guaranteed with sufficient redundancy of ground point observations as compared with the number of images (e.g., enough tie points are measured between the images so that the aforementioned condition is satisfied).

Convergence happens when the residuals settle to the same values on consecutive iterations. The convergence criterion can be $$|R^{(p)} - R^{(p-1)}| < \delta$$ Equation 56 where δ is a prescribed tolerance.

A rigorous formulation for the standard error of unit weight (to be used in error propagation discussed elsewhere) is provided in Equation 57

$$[\sigma^{(p)}]^2 = \frac{\sum_{j=1}^{n} \sum_{i \in I_j} \varepsilon_{ij}^T \tilde{W}_{ij} \varepsilon_{ij} + \sum_{i=1}^{m} \dot{C}_i^T \dot{W}_i \dot{C}_i + \sum_{j=1}^{n} \ddot{C}_j^T \ddot{W}_j \ddot{C}_j}{ndof}$$

Equation 57 where ndof is the number of degrees of freedom—the number of observation equations minus the number of error model solution parameters:

$$ndof = q - 7m$$ Equation 58

Since blundered points can be effectively removed from the solution via deweighting, the number of observations remaining effectively doesn't include the blunders. To be strictly correct, the value for q in Equation 58 can be the number of non-blundered observations.

The full form of the matrix Equation 34 can be reduced under the assumption that the errors in the ground point locations are uncorrelated. Under this assumption, the error covariance matrix of the ground point locations $\ddot{\Sigma}$ becomes a block-diagonal matrix of 3×3 matrix blocks. Since it is a sparse matrix, its inverse is easily computed by inverting the 3×3 diagonal blocks. The development in this section reformulates the normal equations taking advantage of this. The result is a reduced normal equation matrix in which the size of the normal matrix is 6m×6m instead of (6m+3n)×(6m+3n). This gives the obvious advantage that the size of the normal matrix is much smaller and remains invariant with the number of ground points.

The reduced system formation is sometimes referred to as a "ground point folding," since the ground point portion of the reduced normal matrix is incorporated into the image portion. The development of the reduced normal equation begins with the original normal equation from Equation 34 and repeated as Equation 59

$$Z\Delta = H$$ Equation 59

To facilitate ground point folding into a reduced normal equation matrix, Equation 59 can be re-written as Equation 60

$$\begin{bmatrix} \dot{Z}_{7m\times 7m} & \overline{Z}_{7m\times 3n} \\ \overline{Z}^T_{3n\times 6m} & \ddot{Z}_{3n\times 3n} \end{bmatrix} \begin{bmatrix} \dot{\Delta}_{7m\times 1} \\ \ddot{\Delta}_{3n\times 1} \end{bmatrix} = \begin{bmatrix} \dot{H}_{7m\times 1} \\ \ddot{H}_{3n\times 1} \end{bmatrix}$$  Equation 60 where $\dot{Z} = \dot{N} + \dot{W}$  Equation 61

$\overline{Z} = \overline{N}$  Equation 62

$\ddot{Z} = \ddot{N} + \ddot{W}$  Equation 63

$\dot{H} = \dot{K} - \dot{W}\dot{C}$  Equation 64

$\ddot{H} = \ddot{K} - \ddot{W}\ddot{C}$  Equation 65

Suppose a matrix system $Z\Delta = H$ is partitioned into blocks of the appropriate sizes as $$\begin{bmatrix} A & B \\ C & D \end{bmatrix} \begin{bmatrix} a \\ b \end{bmatrix} = \begin{bmatrix} c \\ d \end{bmatrix}$$  Equation 66 where the matrices A and D are both square.

Further, assume that matrix D is non-singular and can be represented as a sparse block diagonal matrix. Then $[A - BD^{-1}C][a] = [c - BD^{-1}d]$  Equation 67

Applying Equation 67 to Equation 59 provides the reduced normal matrix equation $[\dot{Z} - \overline{Z}\ddot{Z}^{-1}\overline{Z}^T][\dot{\Delta}] = [\dot{H} - \overline{Z}\ddot{Z}^{-1}\ddot{H}]$  Equation 68

The reduced normal equation matrix can be written as in Equation 69

$M\dot{\Delta} = C$  Equation 69 where $M \equiv [\dot{Z} - \overline{Z}\ddot{Z}^{-1}\overline{Z}^T]$ and $C \equiv [\dot{H} - \overline{Z}\ddot{Z}^{-1}\ddot{H}]$.

Next it is of interest to examine the form of the components of the reduced system for an efficient implementation. Let $\hat{Z} \equiv \overline{Z}\ddot{Z}^{-1}\overline{Z}^T$. Then $$\hat{Z}_{7m\times 7m} = \begin{bmatrix} \overline{Z}_{11} & \cdots & \overline{Z}_{1n} \\ \vdots & \ddots & \vdots \\ \overline{Z}_{m1} & \cdots & \overline{Z}_{mn} \end{bmatrix} \begin{bmatrix} \ddot{Z}_1^{-1} & 0 & \cdots & 0 \\ 0 & \ddot{Z}_2^{-1} & \cdots & 0 \\ \vdots & \vdots & \ddots & \vdots \\ 0 & 0 & \cdots & \ddot{Z}_n^{-1} \end{bmatrix} \begin{bmatrix} \overline{Z}_{11}^T & \cdots & \overline{Z}_{m1}^T \\ \vdots & \ddots & \vdots \\ \overline{Z}_{1n}^T & \cdots & \overline{Z}_{mn}^T \end{bmatrix}$$  Equation 70

By extension $$\hat{Z}_{7m\times 7m} = \begin{bmatrix} \sum_{j=1}^n \overline{Z}_{1j}\ddot{Z}_j^{-1}\overline{Z}_{1j}^T & \sum_{j=1}^n \overline{Z}_{1j}\ddot{Z}_j^{-1}\overline{Z}_{2j}^T & \cdots & \sum_{j=1}^n \overline{Z}_{1j}\ddot{Z}_j^{-1}\overline{Z}_{mj}^T \\ \sum_{j=1}^n \overline{Z}_{2j}\ddot{Z}_j^{-1}\overline{Z}_{1j}^T & \sum_{j=1}^n \overline{Z}_{2j}\ddot{Z}_j^{-1}\overline{Z}_{2j}^T & \cdots & \sum_{j=1}^n \overline{Z}_{2j}\ddot{Z}_j^{-1}\overline{Z}_{mj}^T \\ \vdots & \vdots & \ddots & \vdots \\ \sum_{j=1}^n \overline{Z}_{mj}\ddot{Z}_j^{-1}\overline{Z}_{1j}^T & \sum_{j=1}^n \overline{Z}_{mj}\ddot{Z}_j^{-1}\overline{Z}_{2j}^T & \cdots & \sum_{j=1}^n \overline{Z}_{mj}\ddot{Z}_j^{-1}\overline{Z}_{mj}^T \end{bmatrix}$$  Equation 71

The blocks of $\hat{Z}$ in Equation 71 can be the equivalent $\overline{N}_{ij}$ as defined in equation 47.

The assumption that errors in the a priori ground points are uncorrelated yields Equation 72

$$\ddot{W}_{3n\times 3n} = \begin{bmatrix} \Sigma_1^{-1}{}_{3\times 3} & 0 & \cdots & 0 \\ 0 & \Sigma_2^{-1}{}_{3\times 3} & \cdots & 0 \\ \vdots & \vdots & \ddots & \vdots \\ 0 & 0 & \cdots & \Sigma_n^{-1}{}_{3\times 3} \end{bmatrix}$$  Equation 72 where $\Sigma_j^{-1}$ is the inverse of the a priori covariance matrix for ground point j. Thus $\ddot{Z}_j^{-1}{}_{3\times 3} = [\ddot{N}_j + \ddot{W}_j]^{-1}$  Equation 73

The general row and column term for $\hat{Z}$ can then be given by $\hat{Z}_{r,c}{}_{7\times 7} = \sum_{j=1}^n \overline{Z}_{rj}\ddot{Z}_j^{-1}\overline{Z}_{cj}^T$  Equation 74 and, by the definition of $\overline{Z}_{ij}$, $\hat{Z}_{r,c}$ is zero if and only if images r and c have no ground points in common. Also note that $\hat{Z}$ is block symmetric. Thus, in its formation, only the upper block triangle need be formed, followed by reflection of the upper right triangle to the lower left triangle for completion of the matrix formation.

The matrix M can thus be written as in Equation 75

$$M_{(7m\times 7m)} = \begin{bmatrix} \dot{Z}_1{}_{(7\times 7)} & 0 & \cdots & 0 \\ 0 & \dot{Z}_2{}_{(7\times 7)} & \cdots & 0 \\ \vdots & \vdots & \ddots & \vdots \\ 0 & 0 & \cdots & \dot{Z}_p{}_{(7\times 7)} \end{bmatrix} - \begin{bmatrix} \sum_{j=1}^n \overline{Z}_{1j}\ddot{Z}_j^{-1}\overline{Z}_{1j}^T & \sum_{j=1}^n \overline{Z}_{1j}\ddot{Z}_j^{-1}\overline{Z}_{2j}^T & \cdots & \sum_{j=1}^n \overline{Z}_{1j}\ddot{Z}_j^{-1}\overline{Z}_{mj}^T \\ \sum_{j=1}^n \overline{Z}_{2j}\ddot{Z}_j^{-1}\overline{Z}_{1j}^T & \sum_{j=1}^n \overline{Z}_{2j}\ddot{Z}_j^{-1}\overline{Z}_{2j}^T & \cdots & \sum_{j=1}^n \overline{Z}_{2j}\ddot{Z}_j^{-1}\overline{Z}_{mj}^T \\ \vdots & \vdots & \ddots & \vdots \\ \sum_{j=1}^n \overline{Z}_{mj}\ddot{Z}_j^{-1}\overline{Z}_{1j}^T & \sum_{j=1}^n \overline{Z}_{mj}\ddot{Z}_j^{-1}\overline{Z}_{2j}^T & \cdots & \sum_{j=1}^n \overline{Z}_{mj}\ddot{Z}_j^{-1}\overline{Z}_{mj}^T \end{bmatrix}$$  Equation 75

The reduced matrix M can be formed by first storing the diagonal entries of $\dot{Z}$ and then subtracting the summed entries of the subtrahend in Equation 75 (namely the $\ddot{Z}_{r,c}$ defined in Equation 74).

Since the subblocks of the subtrahend are merely summations over the ground point indexes, j, the matrix, M, can be built by iterating over the ground points (assuming the minuend of Equation 75 on-diagonals were formed in advance) and subtracting out the contributions for a particular ground point in the appropriate place within M.

The constant column vector C can be formed similarly with some of the same matrices:

$$C = \begin{bmatrix} \dot{H}_1 \\ \vdots \\ \dot{H}_m \end{bmatrix} - \begin{bmatrix} \sum_{j=1}^{n} \overline{Z}_{1j} \ddot{Z}_j^{-1} \ddot{H}_j \\ \vdots \\ \sum_{j=1}^{n} \overline{Z}_{mj} \ddot{Z}_j^{-1} \ddot{H}_j \end{bmatrix} \quad \text{Equation 76}$$

After the matrices M and C are built, the solution vector for the adjustable parameters from the reduced system can be computed as $$\dot{\Delta} = M^{-1} C \quad \text{Equation 77}$$

The solution vector can be decomposed into per-image-adjustable vectors $\dot{\Delta}_i$ for each image i as in Equation 78:

$$\dot{\Delta} = \begin{bmatrix} \dot{\Delta}_1 \\ \dot{\Delta}_2 \\ \vdots \\ \dot{\Delta}_m \end{bmatrix} \quad \text{Equation 78}$$

After the solution vector $\dot{\Delta}$ for the image-adjustable parameters is obtained, the solution vector $\ddot{\Delta}$ for corrections to the ground point positions can be extracted (or "unfolded") from the reduced system. To formulate the extraction, Equation 67 can be used to obtain Equation 79

$$\underset{3n\times 1}{\ddot{\Delta}} = \ddot{Z}^{-1}\left[\ddot{H} - \overline{Z}^T \dot{\Delta}\right] \text{ If} \quad \text{Equation 79}$$

$$\underset{3n\times 1}{\ddot{\Delta}} = \begin{bmatrix} \ddot{\Delta}_1 \\ _{3\times 1} \\ \ddot{\Delta}_2 \\ _{3\times 1} \\ \vdots \\ \ddot{\Delta}_n \\ _{3\times 1} \end{bmatrix} \quad \text{Equation 80}$$

represents the correction vector for the ground points then $$\begin{bmatrix} \ddot{\Delta}_1 \\ _{3\times 1} \\ \ddot{\Delta}_2 \\ _{3\times 1} \\ \vdots \\ \ddot{\Delta}_n \\ _{3\times 1} \end{bmatrix} = \begin{bmatrix} \ddot{Z}_1^{-1} & 0 & \cdots & 0 \\ _{(3\times 3)} & & & \\ 0 & \ddot{Z}_2^{-1} & \cdots & 0 \\ & _{(3\times 3)} & & \\ \vdots & \vdots & \ddots & \vdots \\ 0 & 0 & \cdots & \ddot{Z}_n^{-1} \\ & & & _{(3\times 3)} \end{bmatrix} \left( \begin{bmatrix} \ddot{H}_1 \\ _{3\times 1} \\ \ddot{H}_2 \\ _{3\times 1} \\ \vdots \\ \ddot{H}_n \\ _{3\times 1} \end{bmatrix} - \right. \quad \text{Equation 81}$$

$$\left. \begin{bmatrix} \overline{Z}_{11}^T & \cdots & \overline{Z}_{m1}^T \\ _{(3\times 7)} & & _{(3\times 7)} \\ \vdots & \ddots & \vdots \\ \overline{Z}_{1n}^T & \cdots & \overline{Z}_{mn}^T \\ _{(3\times 7)} & & _{(3\times 7)} \end{bmatrix} \begin{bmatrix} \dot{\Delta}_1 \\ _{7\times 1} \\ \dot{\Delta}_2 \\ _{7\times 1} \\ \vdots \\ \dot{\Delta}_n \\ _{7\times 1} \end{bmatrix} \right)$$

where $\dot{\Delta}_i$ is the adjustable parameter correction vector for image i. Thus $$\underset{3\times 1}{\ddot{\Delta}}_j = \ddot{Z}_j^{-1}\left[\ddot{H}_j - \sum_{i \in I_j} \overline{Z}_{ij}^T \dot{\Delta}_i\right] \quad \text{Equation 82}$$

where $I_j$ is as defined as the index set of images upon which ground point j is an observation.

This section provides formulations for extraction of a posteriori error covariances for ground points. If a priori sensor model error estimates are available (and reliable), the errors may be propagated to the space of the registration error models. In this case, the error propagation is a rigorous predicted error for the accuracy of the a posteriori ground point locations.

The a posteriori error covariances of the image parameters are the appropriate subblocks of the inverse of the reduced normal matrix $M^{-1}$ from Equation 69 (after application of the variance of unit weight, as described at the end of this section). For the full normal matrix solution, the a posteriori error covariance can be the inverse of the normal matrix, $Z^{-1}$, times the variance of unit weight. For the reduced system, however, the a posteriori error covariances of the ground points can be extracted from $M^{-1}$ by unfolding. To facilitate this, the full normal matrix can be written as $$Z = \begin{bmatrix} \dot{Z} & \overline{Z} \\ _{(7m\times 7m)} & _{(7m\times 3n)} \\ \overline{Z}^T & \ddot{Z} \\ _{(3n\times 7m)} & _{(3n\times 3n)} \end{bmatrix} \quad \text{Equation 83}$$

Denote the inverse matrix blocks as $$Z^{-1} = \begin{bmatrix} \dot{\Sigma} & \overline{\Sigma} \\ \overline{\Sigma}^T & \ddot{\Sigma} \end{bmatrix} \quad \text{Equation 84}$$

Note that, $\dot{\Sigma}$ and $\ddot{\Sigma}$ as defined are distinctly different from those defined in previous sections. (The symbols in the present section are a posteriori covariances and those in previous sections are a priori covariances). However, this subtle distinction is not problematic if the appropriate context is adhered.

$$\underset{3n\times 3n}{\ddot{\Sigma}} = \ddot{Z}^{-1} + \ddot{Z}^{-1} \overline{Z}^T \dot{\Sigma} \overline{Z} \ddot{Z}^{-1} \quad \text{Equation 85}$$

The a posteriori covariance between ground points r and c can be represented as block element $\sum_{\substack{r,c \\ 3\times 3}}$ of $\ddot{\Sigma}$.

With n as the number or ground points and m as the number of images, $$\ddot{\Sigma} = \begin{bmatrix} \ddot{\sum}_{11} & \cdots & \ddot{\sum}_{1n} \\ \vdots & \ddots & \vdots \\ \ddot{\sum}_{n1} & \cdots & \ddot{\sum}_{nn} \end{bmatrix} = \begin{bmatrix} \ddot{Z}_1^{-1} & 0 & \cdots & 0 \\ 0 & \ddot{Z}_2^{-1} & \cdots & 0 \\ \vdots & \vdots & \ddots & \vdots \\ 0 & 0 & \cdots & \ddot{Z}_n^{-1} \end{bmatrix} +$$

$$\begin{bmatrix} \ddot{Z}_1^{-1} & 0 & \cdots & 0 \\ 0 & \ddot{Z}_2^{-1} & \cdots & 0 \\ \vdots & \vdots & \ddots & \vdots \\ 0 & 0 & \cdots & \ddot{Z}_n^{-1} \end{bmatrix} \overline{Z}^T \dot{\Sigma} \overline{Z} \begin{bmatrix} \ddot{Z}_1^{-1} & 0 & \cdots & 0 \\ 0 & \ddot{Z}_2^{-1} & \cdots & 0 \\ \vdots & \vdots & \ddots & \vdots \\ 0 & 0 & \cdots & \ddot{Z}_n^{-1} \end{bmatrix}$$

Equation 86

The $r^{th}$ row of $\ddot{\Sigma}$ involves only $\ddot{Z}_r^{-1}$ of the first $\ddot{Z}^{-1}$ matrix in term two of Equation 86. Similarly, the $c^{th}$ column of $\ddot{\Sigma}$ involves only $\ddot{Z}_c^{-1}$ of the second $\ddot{Z}^{-1}$ matrix in term two. Thus $$\ddot{\Sigma}_{r,c} = \delta(r,c)\ddot{Z}_c^{-1} + \ddot{Z}_r^{-1}\overline{Z}^T\dot{\Sigma}\overline{Z}\ddot{Z}_c^{-1} \qquad \text{Equation 87}$$

where the delta function can be $$\delta(r,c) \equiv \begin{cases} 1 & \text{if } r = c \\ 0 & \text{otherwise} \end{cases} \qquad \text{Equation 88}$$

Now the form of the (r, c) block of $\overline{Z}^T \dot{\Sigma} \overline{Z}$ is derived. Let $$\underset{3m\times 3m}{G} \equiv \overline{Z}^T \dot{\Sigma} \overline{Z} = \begin{bmatrix} \overline{Z}_{11}^T & \cdots & \overline{Z}_{m1}^T \\ (3\times 7) & & (3\times 7) \\ \vdots & \ddots & \vdots \\ \overline{Z}_{1n}^T & \cdots & \overline{Z}_{mn}^T \\ (3\times 7) & & (3\times 7) \end{bmatrix} \qquad \text{Equation 89}$$

$$\begin{bmatrix} \dot{\sum}_{11} & \dot{\sum}_{12} & \cdots & \dot{\sum}_{1m} \\ (7\times 7) & (7\times 7) & & (7\times 7) \\ \dot{\sum}_{21} & \dot{\sum}_{22} & \cdots & \dot{\sum}_{2m} \\ (7\times 7) & (7\times 7) & & (7\times 7) \\ \vdots & \vdots & \ddots & \vdots \\ \dot{\sum}_{m1} & \dot{\sum}_{m2} & \cdots & \dot{\sum}_{mn} \\ (7\times 7) & (7\times 7) & & (7\times 7) \end{bmatrix} \begin{bmatrix} \overline{Z}_{11} & \cdots & \overline{Z}_{1n} \\ (7\times 3) & & (7\times 3) \\ \vdots & \ddots & \vdots \\ \overline{Z}_{m1} & \cdots & \overline{Z}_{mn} \\ (7\times 3) & & (7\times 3) \end{bmatrix}$$

The $r^{th}$ row of G involves only the $r^{th}$ row of $\overline{Z}^T$ and the $c^{th}$ column of G involves only the $c^{th}$ column of $\overline{Z}$. Thus $$\underset{3\times 3}{G_{r,c}} = \begin{bmatrix} Z_{1r}^T \dot{\sum}_{11} + \ldots + Z_{mr}^T \dot{\sum}_{m1} & Z_{1r}^T \dot{\sum}_{12} + \ldots + Z_{mr}^T \dot{\sum}_{m2} & \cdots \end{bmatrix} \qquad \text{Equation 90}$$

$$\overline{Z} = \begin{bmatrix} \sum_{s=1}^{m} Z_{sr}^T \dot{\sum}_{s1} & \sum_{s=1}^{m} Z_{sr}^T \dot{\sum}_{s2} & \cdots \end{bmatrix} \begin{bmatrix} Z_{1c} \\ Z_{2c} \\ \vdots \\ Z_{mc} \end{bmatrix} =$$

$$\sum_{t=1}^{m}\left[\sum_{s=1}^{m} Z_{sr}^T \dot{\sum}_{st}\right] Z_{tc}$$

Now $\overline{Z}_{ij}=0$ if ground point j is not an observation on image i.

Thus $$T_{r,c} = \sum_{t \in I_c}[\sum_{s \in I_r} \overline{Z}_{sr}^T \dot{\Sigma}_{st}]\overline{Z}_{tc} \qquad \text{Equation 91}$$

where $I_j$ is the index set of images upon which ground point j is an observation. Substituting Equation 91 into Equation 87 yields $$\ddot{\Sigma}_{r,c} = \delta(r,c)\ddot{Z}_c^{-1} + \ddot{Z}_r^{-1}[\sum_{t \in I_c}[\sum_{s \in I_r}\overline{Z}_{sr}^T\dot{\Sigma}_{st}]\overline{Z}_{tc}]\ddot{Z}_c^{-1} \qquad \text{Equation 92}$$

The a posteriori covariance is usually defined by scaling the inverse of the normal matrix by an estimate of the variance of unit weight. An estimate of the variance of unit weight is denoted as $[\sigma^{(p)}]^2$ and is provided in Equation 57. Thus, the above formulation can be used, but instead defining $$\begin{bmatrix} \dot{\sum} & \overline{\sum} \\ \overline{\sum}^T & \ddot{\sum} \end{bmatrix} = [\sigma^{(p)}]^2[Z^{-1}] \qquad \text{Equation 93}$$

For a full normal matrix solution, $Z^{-1}$ is readily available, thus the a posteriori covariance of the error model parameters and ground points can be the right hand side of Equation 93.

The right hand summand of Equation 92 includes the factor $[\sigma^{(p)}]^2$ since it includes $\dot{\Sigma}_{st}$. However, the left hand summand does not include the factor. This can be compensated for by a modified form of Equation 92

$$\ddot{\Sigma}_{r,c} = [\sigma^{(p)}]^2 \delta(r,c)\ddot{Z}_c^{-1} + \ddot{Z}_r^{-1}[\sum_{t \in I_c}[\sum_{s \in I_r}\overline{Z}_{sr}^T\dot{\Sigma}_{st}]\overline{Z}_{tc}]\ddot{Z}_c^{-1} \qquad \text{Equation 94}$$

If the standard error of unit weight $\sigma^{(p)}$ is deemed to be unreliable (e.g., is much greater than unity) this may be an indicator of improper (or incorrect) a priori error covariance in the process. One can still, however, be able to provide a reliable error estimate from the least squares process by simply forcing the standard error to one (e.g., by setting $\sigma^{(p)} \leftarrow 1.0$ in Equations 93 and 94.

Figure 3:
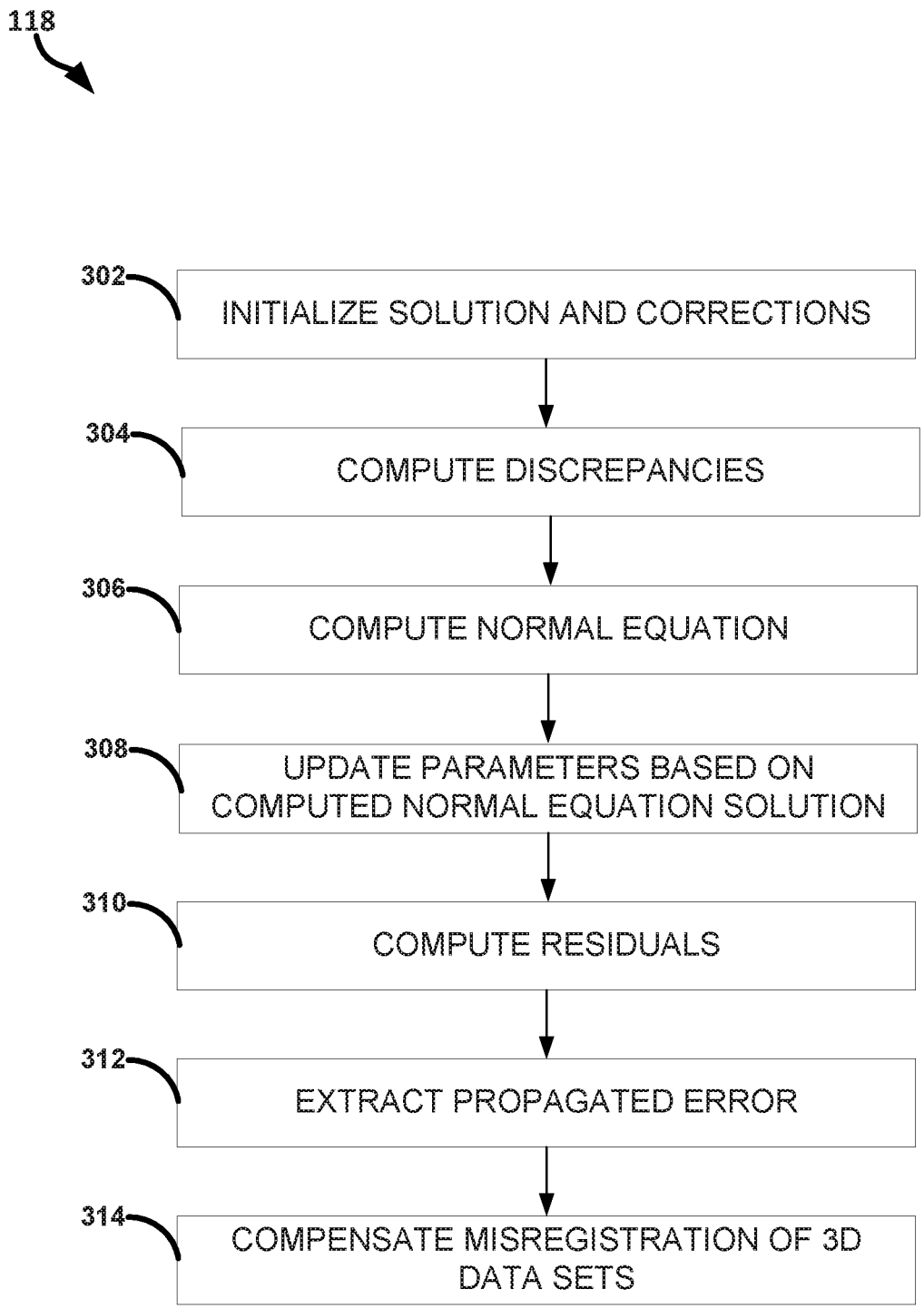
FIG. 3 illustrates an example of an embodiment of a bundle adjust operation.

FIG. 3 illustrates an example of an embodiment of the operation 118. The operation 118 can include 3D data set registration with error propagation. The operation 118, as illustrated, includes initializing solution and corrections, at operation 302; computing discrepancies, at operation 304; computing a normal equation solution, at operation 306; updating parameters based on the computed normal equation solution, at operation 308; computing residuals, at operation 310; extracting propagated error, at operation 312; and compensating misregistration of the first 3D point set 104 and the second 3D point set 106, at operation 314.

The operation 302 can include setting the solution vector X and the correction vector ΔX to the zero vector[1]:

[1] The solution vector X is set to the fixed-point location for the linearization. If an a priori estimate is available, it is used here in place of the zero vector.

$$X = \underset{7 \times 1}{0}$$

$$\Delta X = \underset{7 \times 1}{0}$$

The operation 304 can include computing the discrepancy vector for each observation as provided in Equation 29. The operation 306 can include building the normal equations matrices and solving for the correction vector as provided in Equation 53. The operation 308 can include updating the parameter vector for the current iteration as provided in Equations 51 and 52. Details of the operation 308 for unfolding of the ground points for the folded normal equation solution is provided via pseudocode below.

The operation 310 can include computing the residuals (final discrepancies) as provided in Equation 29. The operation 312 can include computing a standard error of unit weight via Equation 57. Note that the standard error can be the square root of the left hand side of the Equation 57 (e.g., $\sigma^{(p)} = \sqrt{[\sigma^{(p)}]^2}$).

If the delta between the current and previous standard error of unit weight is less than the convergence criterion in absolute value, the solution nominally converged. To accommodate blunder rejection, the convergence criterion check can be augmented with a check to see if the blunder weights should be used in continuation of the solution ("useBW", indicating to use "blunder-checking weighting"). If convergence occurs and useBW is true, this is an indicator to perform blunder checking, and this time using a normalized residual computation in order to check for blunders on the next iteration.

If useBW is true, blunders can be computed. If there are blunders remaining, the blunder "cycle" number is incremented and the process is repeated with the correction vector reset to a priori values (e.g., go to operation 302). If there are no blunders remaining, a check can be performed to see if the number of post convergence blunder cycles can be set to zero. This check can be performed to effectively force one more solution after all blunders have been eliminated.

If useBW is false and it is currently a first iteration of a blundering solution, useBW can be set to true. This has the effect of forcing the normalized residual blunder iteration for determining the blunders on subsequent iterations. In this case, a solution has converged but normalized blunder residuals have not been computed. Setting useBW to true can forces this to happen on the next solution iteration. The solution can be iterated by going to the operation 306. If there are no more blunders and the number of blunders is not zero, this indicates the "non-blunder iteration" solution has converged.

The operation 118 can include providing a report that includes an iteration number, current correction vector ΔX, current iteration estimates of parameters and ground points (e.g., as computed in equations 51 and 52), standard error of unit weight (e.g., as provided in Equation 55). The operation 118 can include a check for non-convergence by examining the current iteration number with a maximum number of iterations, M. If the number of iterations exceeds the maximum, stop the iteration process. The solution did not converge. An exception can be raised and the operation 118 can be complete.

The following is a pseudocode outline for the operation 118 for computing the full normal equations solution. This first pseudocode does not include ground point folding.

The names in {braces} allude to method (e.g., function) names in a software implementation. Also, within the development below, ground point indexes, ground point observation indexes and image indexes are assumed to be zero-relative. For efficiency in the implementation, the following elements can be cached in a per-image workspace object, which is updated with each iteration:

1. Values for trig functions $s\omega$, $c\omega$, $s\phi$, $c\phi$, $s\kappa$, $c\kappa$ as given in Equation 4.
2. Three 3×3 partial derivative matrices of T with respect to the three angles as given in the following Equations 95-97:

$$T^\omega \equiv \frac{\partial T}{\partial \omega} = \begin{bmatrix} 0 & -s\omega s\kappa + c\omega s\phi c\kappa & c\omega s\kappa + s\omega s\phi c\kappa \\ 0 & -s\omega c\kappa - c\omega s\phi s\kappa & c\omega c\kappa - s\omega s\phi s\kappa \\ 0 & -c\omega c\phi & -s\omega c\phi \end{bmatrix} \quad \text{Equation 95}$$

$$T^\phi \equiv \frac{\partial T}{\partial \phi} = \begin{bmatrix} -s\phi c\kappa & s\omega c\phi c\kappa & -c\omega c\phi c\kappa \\ s\phi s\kappa & -s\omega c\phi s\kappa & c\omega c\phi s\kappa \\ c\phi & s\omega s\phi & -c\omega s\phi \end{bmatrix} \quad \text{Equation 96}$$

$$T^\kappa \equiv \frac{\partial T}{\partial \kappa} = \begin{bmatrix} -c\phi s\kappa & c\omega c\kappa - s\omega s\phi s\kappa & s\omega c\kappa + c\omega s\phi s\kappa \\ -c\phi c\kappa & -c\omega s\kappa - s\omega s\phi c\kappa & -s\omega s\kappa + c\omega s\phi c\kappa \\ 0 & 0 & 0 \end{bmatrix} \quad \text{Equation 97}$$

3. Rotation matrix $T_i$ as given in Equation 4
4. 3×1 vector $\overline{V}_i$

The pseudocode begins by setting the non-linear least squares iteration index (p) to zero.

1. {initializeData} Store nominal initial values for the solved parameters for each image $i \in \{0, \ldots, m-1\}$. The initial values for $\overline{V}_i^{(0)}$ and $\theta_i^{(0)}$.

$$\dot{C}_i^{(0)} \equiv \begin{bmatrix} \overline{V}_i^{(0)} \\ \theta_i^{(0)} \\ s_i^{(0)} \end{bmatrix}_{7 \times 1} \quad \text{Equation 98}$$

2. {initializeData} Compute
   a. Initial ground point coordinates via Equation 11 for each ground point $j \in \{0, \ldots, n-1\}$. These form $\ddot{C}_j^{(0)}$.
   b. Initial image cache data as described previously.

-continued

3. {outputIterationReport} Output initial iteration report (input parameters, initial ground point and ground point observation coordinates.)
4. {initializeMatrices} Block partition the $\dot{N}$ portion of Z into m subblocks, each of size 6 × 6.
5. {initializeMatrices} Block partition the $\ddot{N}$ portion of Z into n subblocks, each of size 3 × 3.
6. {initializeMatrices} Block partition H similarly
7. {computeAndStoreDiscrepancies} For each ground point index $j \in \{0, \ldots, n-1\}$ and each observation of that ground point $i \in O_j$, compute the discrepancy vector $\varepsilon_{ij}$ given in Equation 29 as follows.
   for $j \in \{0, \ldots, n-1\}$
   {
       Fetch the most recent ground point position $\hat{V}_j$.
       for $i \in I_j$ and observation index $b \in O_j$
       {
           a) Retrieve image-cached values for $T_i$ and $\overline{V}_i$
           b) Retrieve ground point observation $\hat{V}_{ij} = \hat{V}_b$
           c) Apply the observation equation to obtain the projected value for $\hat{V}_j$.

Equation 99
$$V_{ij} = (1 + s_i)T_i(\hat{V}_j - \overline{V}_i)$$

d) Compute and store the discrepancy vector for observation b as in Equation 29

Equation 100
$$\varepsilon_b \equiv \varepsilon_{ij} = -[\tilde{V}_{ij} - V_{ij}]$$

}// end for i
   }//end for j
8. Compute the standard error of unit weight as in Equation 57.
9. {buildNormalMatrices + initialize Weights} Zero Z and H and initialize Z (and likewise H) with the block weight matrices on the diagonal. This involves setting the blocks of Z to the subblocks of $\dot{W}$ and $\ddot{W}$. and setting the subblocks (subrows) of H to $-\dot{W}\dot{C}$ and $-\ddot{W}\ddot{C}$.
10. {sumInPartials} Loop over ground points and images containing the ground points and sum in the contributions of the $\dot{B}$ and $\ddot{B}$ matrices into Z and H.
    for $j \in \{0, \ldots, n-1\}$
    {
        for $i \in I_j$
        {
            Retrieve $\varepsilon_b \equiv \varepsilon_{ij}$ as computed in Equation 100
            Compute $\dot{B}_{ij}$ and $\ddot{B}_{ij}$ as in Equations 101 and 102.

Equation 101
$$\underset{3\times 7}{\dot{B}_{ij}} = \begin{bmatrix} \underset{3\times 3}{(1+s_i)T_i} & \underset{3\times 3}{(1+s_i)A_{ij}} & \underset{3\times 1}{-T_iY_{ij}} \end{bmatrix}$$

Equation 102
$$\underset{3\times 3}{\ddot{B}_{ij}} = -(1+s_i)\underset{3\times 3}{[T_i]}$$

Retrieve observation weight matrix $\tilde{W}_{ij}$
        $\dot{N}_i$: Sum $\dot{B}_{ij}^T\tilde{W}_{ij}\dot{B}_{ij}$ into Z.block(i, i)
        $\ddot{N}_j$: Sum $\ddot{B}_{ij}^T\tilde{W}_{ij}\ddot{B}_{ij}$ into Z.block(m + j, m + j)
        $\tilde{N}_{ij}$: Sum $\dot{B}_{ij}^T\tilde{W}_{ij}\ddot{B}_{ij}$ into Z.block(i, m + j)
        $\dot{C}_i$: Sum $\dot{B}_{ij}^T\tilde{W}_{ij}\varepsilon_{ij}$ into H.block(i, 0)
        $\ddot{C}_j$: Sum $\ddot{B}_{ij}^T\tilde{W}_{ij}\varepsilon_{ij}$ into H.block(m + j, 0)
        } //end i
    } // end j
11. {solveNormalEquation} Form the lower transpose of the Z matrix and solve the system $\Delta = Z^{-1}H$. Note that the normal equation system is a symmetric system (e.g., the normal matrix Z is symmetric). Thus, a symmetric system solver can be used. In the case of a symmetric system solver, it may not be necessary to form the lower triangle.
12. {updateParameters} Update all the parameters by extracting the corrections from the $\Delta$ matrix as in Equations 51 and 52.
13. If (p) ≠ 0 compare with the previous RMS of residuals and check for convergence. The convergence condition can be Equation 103
$$|R^{(p)} - R^{(p-1)}| < \delta$$

14. {computePostConvergenceResiduals + checkForBlunders} If convergence has been reached, perform automatic blunder editing. If convergence has not been reached, increment the iteration index $$(p) \leftarrow (p+1) \quad \text{Equation 104}$$

and go to step 7.

What follows is pseudocode for the operation 118 for building the reduced normal equations system, computing corrections to ground point positions and performing error propagation via extraction of data from the reduced normal matrix. This portion of the pseudocode includes ground point coordinate folding.

As in the full normal solution provided in the previous pseudocode, the same per-image elements are cached in a workspace object and updated with each iteration. The algorithm for the reduced solution can be broken into two major portions: priming and folding. Priming involves storing of weights and the contributions along the diagonal of the full normal equation matrix (and corresponding data for the right hand column vector H). This corresponds to the $\dot{Z}$ portion of Z. Thus, priming involved formation of the minuends of Equation 75 and Equation 76. Folding can include incorporation of the subtrahends of the aforementioned Equations.

To provide an efficient implementation, a ground point workspace can be created. The workspace can include the following elements: $\ddot{Z}_j, \ddot{H}_j, \ddot{Z}_j^{-1}$. These things are indexed by ground point for the ground point workspace. The technique can begin by setting the non-linear least squares iteration index (p) to zero.

1. {initializeData} Store nominal initial values for the solved parameters for each image $i \in \{0, \ldots, m-1\}$. The initial values for $\nabla_i^{(0)}$ and $\theta_i^{(0)}$ can also be set along with $\dot{C}_i^{(0)}$ as in Equation 98.
2. {initializeData} Compute
   a. Initial ground point coordinates via Equation 11 for each ground point $j \in \{0, \ldots, n-1\}$. These form $\ddot{C}_j^{(0)}$.
   b. Initial image cache data as described above.
3. {outputIterationReport} Output initial iteration report (input parameters, initial ground point, and ground point observation coordinates).
4. {initializeMatrices} Block partition the reduced normal matrix M into m subblocks, each of size 6 × 6. Block partition the reduced column vector C similarly
5. {computeAndStoreDiscrepancies} For each ground point index $j \in \{0, \ldots, n-1\}$ and each observation of that ground point $i \in O_j$, compute the discrepancy vector $\varepsilon_{ij}$ given in Equation 29 as:
   for $j \in \{0, \ldots, n-1\}$
   {
       Fetch the most recent ground point position $\hat{V}_j$.
       for $i \in I_j$ and observation index $b \in O_j$
       {
           a) Retrieve image-cached values for $T_i$ and $\nabla_i$
           b) Retrieve ground point observation $\hat{V}_{ij} = \hat{V}_b$
           c) Apply the observation equation to obtain the projected value for $\hat{V}_j$ from Equation 99.
           d) Compute and store the discrepancy vector for observation b as in Equation 100
       }// end for i
   }//end for j
6. Compute the standard error of unit weight.as in Equation 57.
7. {buildNormalMatrices}
   a. Zero the reduced matrices M and C
   b. {initialize Weights} Initialize M (and likewise C) with the block weight matrices on the diagonal. This involves setting the blocks of M to the subblocks of $\dot{W}$ and setting the subblocks (subrows) of C to $-\dot{W} \dot{C}$.
   c. {sumInPartialsAndFoldGPs} Form the main diagonal and ground point matrices $\ddot{Z}_j$ by iterating over ground points. Perform folding for ground point j
   for $j \in \{0, \ldots, n-1\}$
   {
       PRIMING:
       Store $\ddot{W}_j$ into $\ddot{Z}_j$ of GPWS
       Store $-\ddot{W}_j \ddot{C}_j$ into $\ddot{H}_j$ of GPWS
       for $i \in I_j$ (where $I_j$ is set of image indexes upon which GP j is an observation)
       {
           Form partial derivatives:
               Build $\dot{B}_{ij}$ as in Equation 101
               Build $\ddot{B}_{ij}$ as in Equation 102
               Retrieve discrepancy vector $\varepsilon_{ij}$ as computed in Equation 100.
               Retrieve observation weight matrix $\dot{W}_{ij}$
           Sum in contribution of GP j's obs in image i within M:
               Sum $\dot{B}_{ij}^T \dot{W}_{ij} \dot{B}_{ij}$ into M.block(i,i)
               Sum $\dot{B}_{ij}^T \dot{W}_{ij} \varepsilon_{ij}$ into C.block(i,0)
           Sum in i's contribution to $\ddot{Z}_j$ and $\ddot{H}_j$:
               Sum $\ddot{B}_{ij}^T \dot{W}_{ij} \ddot{B}_{ij}$ into $\ddot{Z}_j$ -continued

```
            Sum B̈_ij^T W̃ ε_ij into Ḧ_j
      }// end i
      Invert Z̈_j and store into GPWS as Z̈_j^{-1}
      FOLDING INTO M (note : iteration loop over j is still valid)
      for r ∈ I_j
      {
            Form Z̄_rj = Ḃ_ij^T W̃_ij B̈_ij as in Equations 69 and 47
            for c ∈ I_j|_{c ≥ r}
            {
                  Form Z̄_cj^T
                  Sum in -Z̄_rj Z̈_j^{-1} Z̄_cj^T into M.block(r, c).
            }//end c
            Sum in -Z̄_rj Z̈_j^{-1} Ḧ_j into C.block(r, 0).
      }//end r
   }// end j
```

8. Complete the lower diagonal entries of M and solve $\dot{\Delta} = M^{-1}C$. As in the full normal equation solution, note that M is symmetric and thus a symmetric system solver is in order.
9. First use pseudocode provided below to compute corrections to ground points. Then update all the parameters from the $\dot{\Delta}$ vector.
10. If (p) ≠ 0 compare with the previous RMS of residuals and check for convergence. The convergence condition is $|R^{(p)} - R^{(p-1)}| < \varepsilon$     Equation 105

11. {computePostConvergenceResiduals + checkForBlunders} If convergence has been reached, perform automatic blunder editing as detailed elsewhere. After there are no more blunders, proceed with error propagation {propagateErrors}. If convergence has not been reached, increment the iteration index as in Equation 104 and go to step 5.

After the solution vector $\dot{\Delta}$ is obtained, unfolding the ground point corrections is a matter of employing Equation 80, replicated here for reference:

$$\underset{3\times 1}{\ddot{\Delta}_j} = \ddot{Z}_j^{-1}\left[\ddot{H}_j - \Sigma_{i\in I_j}\bar{Z}_{ij}^T\dot{\Delta}_i\right]$$

Equation 80

```
{unfoldGroundPoints}
for j ∈ {0, . . . , n - 1}
{
   Retrieve Z̈_j^{-1} and Ḧ_j from GPWS
   Store Ḧ_j into a new subtrahend matrix S (i.e. initialize S to Ḧ_j)
   for r ∈ I_j
   {
      Form Z̄_rj
      Sum -Z̄_rj^T Δ̇_r into S.
   }// end r
   Compute Δ̈_j = Z̈_j^{-1} S
}//end j
```

The general cross error covariance between ground point indexes r and c can obtained by evaluation of Equation 94.

```
{relativeGroundPointCov}
Retrieve Z̈_r^{-1} and Z̈_c^{-1} from ground point workspace.
Obtain indexing sets I_r and I_c (image indexes of ground points r and c)
```

Allocate matrix $\underset{3\times 3}{\ddot{\Sigma}_{r,c}}$ and initialize to zero. This is the output of this function.

Allocate matrix $\underset{3\times 7}{P}$ and initialize to zero

```
for t ∈ I_c
{
```

Allocate matrix $\underset{3\times 7}{Q}$ and initialize to zero

```
   for s ∈ I_r
   {
      Form Z̄_sr and Z̄_tc from Equation 47. (Note that for the reduced system, N̄ = Z̄)
      Extract Σ̇_st = Σ̇.getBlock(s, t), where Σ̇ is as defined in Equation 93
      Set Q ← Q + Z̄_st^T Σ̇_st
   }//end s
   Set P ← P + QZ̄_rc
}//end t
```

```
Compute Σ̈_{r,c} = Z̈_r^{-1} P Z̈_c^{-1}
if(r = c)
{
    Set Σ̈_{r,c} ← [σ^{(p)}]² Z̈_c^{-1} + Σ̈_{r,c}
}
return Σ̈_{r,c}
//end {relativeGroundPointCov}
```

The full 3n×3n ground error covariance matrix $$\ddot{\Sigma}_{3n \times 3n}$$

may be obtained by invoking the method for $r \in \{1, 2, \ldots, n\}$ and for $c \in \{r, r+1, \ldots, n\}$. Note that the indexing for c starts with r since the full ground covariance matrix is symmetric (i.e., build the upper triangle of $$\ddot{\Sigma}_{3n \times 3n}$$

and "reflect about the diagonal" to obtain the lower symmetric portion).

What follows regards how to perform operation 314. The operation 314 proceeds given the outputs of the LSE techniques discussed. The compensation applies the inverse of the observation equation, accommodating the various relative frame offsets to arrive at compensated world space coordinates from misregistered world space coordinates $$V_{reg}^W = \text{Compensate}_i(V_{misreg}^W) \quad \text{Equation 106}$$

The motivation for providing the inputs and outputs in world space coordinates can be that is the native space of the inputs and desired space of the outputs for each element of each image's point cloud.

For an arbitrary misregistered vector $V_{misreg}^W$ on image i, the compensation formula can be performed as in Equation 107

$$V_{reg}^W = \frac{1}{(1+s_1^{(p)})} T_i^T \left( V_{misreg}^W - \bar{V}_i^{(0)R} - V_R^W \right) + \bar{V}_i^{(p)} + V_R^W \quad \text{Equation 107}$$

where $T_i$ is constructed from the solution vector $\theta_i^{(p)}$ and the other symbols in Equation 107 are defined elsewhere. Note that the values for $-\bar{V}^{(0)R} - V_R^W$ and $+\bar{V}_i^{(p)} + V_R^W$ and $T_i^T$ can be precomputed on a per image basis when applying Equation 107 for a time-efficient implementation.

Figure 4:
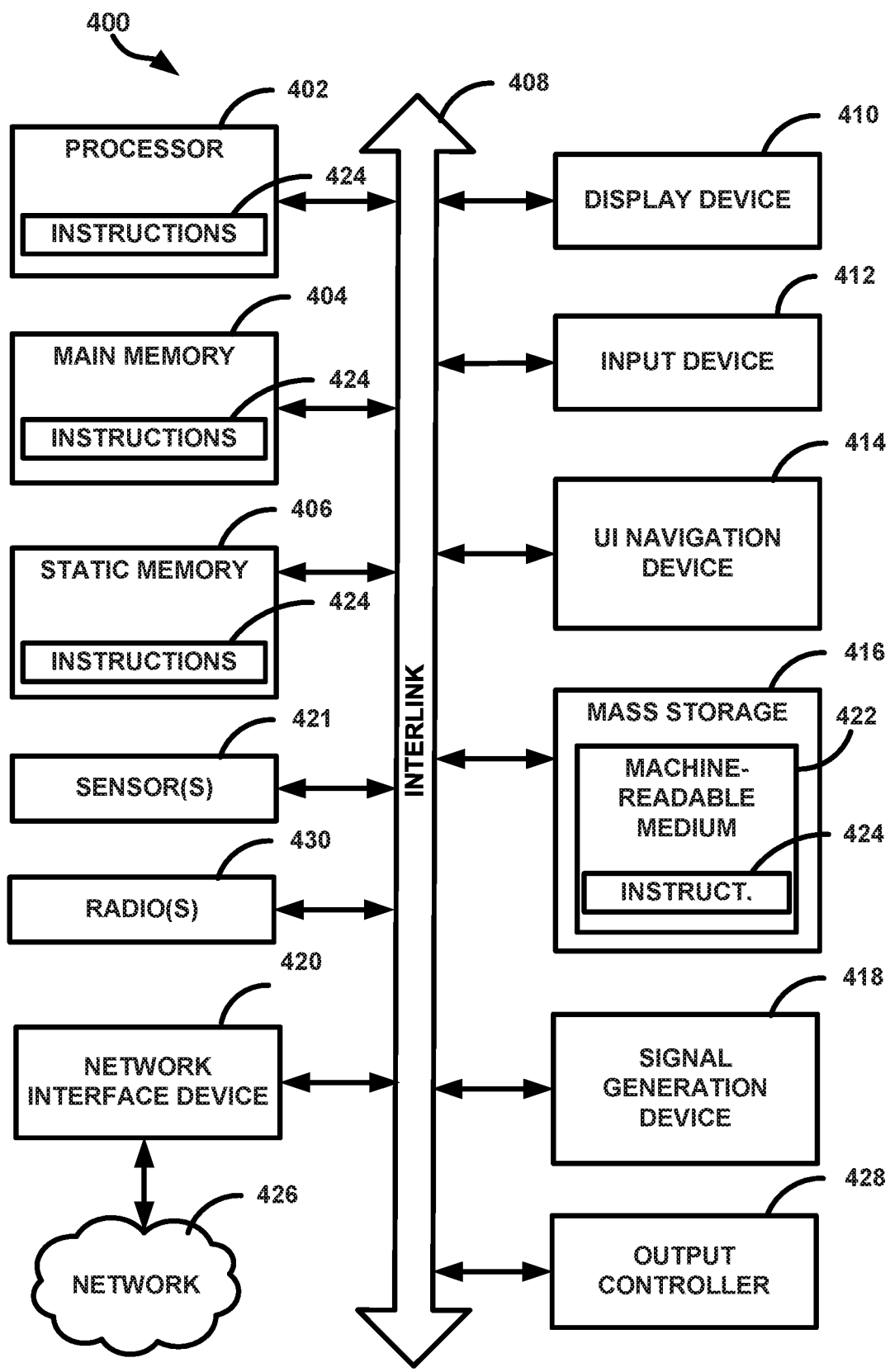
FIG. 4 illustrates, by way of example, a block diagram of an embodiment of a machine in the example form of a computer system within which instructions, for causing the machine to perform any one or more of the methods discussed herein, may be executed.

FIG. 4 illustrates, by way of example, a block diagram of an embodiment of a machine in the example form of a computer system 400 within which instructions, for causing the machine to perform any one or more of the methods discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a mass storage unit 416, a signal generation device 418 (e.g., a speaker), a network interface device 420, and a radio 430 such as Bluetooth, WWAN, WLAN, and NFC, permitting the application of security controls on such protocols.

The mass storage unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 424 may further be transmitted or received over a communications network 426 using a transmission medium. The instructions 424 may be transmitted using the network interface device 420 and any one of a number of well-known transfer protocols (e.g., HTTP).

Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

The subject matter can be understood by way of some examples.

Example 1 can include a method for registering a first three-dimensional (3D) image to a second 3D image with error propagation, the method comprising reducing a sum aggregate of discrepancies between respective tie points and associated 3D points in the first and the second 3D images; adjusting 3D error models of the first and second 3D images based on the reduced discrepancies to generate registered 3D images, and propagating an error of the first or second 3D images to the registered 3D image to generate error of the registered 3D images.

In Example 2, Example 1 can further include conditioning the error of the first and second 3D images before propagating the error.

In Example 3, Example 2 can further include, wherein the conditioned error includes errors in translation in x, errors in translation in y, errors in translation in z, errors in roll, errors in yaw, errors in pitch, and errors in scale between the first and second images.

In Example 4, at least one of Examples 1-3 can further include, wherein reducing the sum aggregate of discrepancies includes using a least squares estimator between the tie points and the associated 3D points in the first and second 3D images.

In Example 5, at least one of Examples 1-4 can further include, wherein the tie points include respective tie point errors and reducing the sum aggregate of discrepancies is further determined based on the tie point errors.

In Example 6, at least one of Examples 1-5 can further include, wherein the error of the registered 3D images is an improvement over the initial errors of the first 3D image and the second 3D image.

In Example 7, at least one of Examples 1-6 can further include, wherein reducing the discrepancies include folding ground points associated with the tie points into a representation of the first and second 3D images.

In Example 8, Example 7 can further include unfolding corrections to the ground points from the representation.

In Example 9, at least one of Examples 1-8 can further include, wherein the first 3D image and the second 3D image are views of first and second geographical regions, respectively, that overlap.

Example 10 can include a non-transitory machine-readable medium including instructions that, when executed by a machine, cause a machine to perform operations for registering a first three-dimensional (3D) image to a second 3D image with error propagation, the operations comprising reducing a sum aggregate of discrepancies between respective tie points and associated 3D points in the first and the second 3D images, adjusting 3D error models of the first and second 3D images based on the reduced discrepancies to generate registered 3D images, and propagating an error of the first or second 3D images to the registered 3D image to generate error of the registered 3D images.

In Example 11, Example 10 can further include, wherein the operations further comprise conditioning the error of the first and second 3D images before propagating the error.

In Example 12, Example 11 can further include, wherein the conditioned error includes errors in translation in x, errors in translation in y, errors in translation in z, errors in roll, errors in yaw, errors in pitch, and errors in scale between the first and second images.

In Example 13, at least one of Examples 10-12 can further include, wherein reducing the sum aggregate of discrepancies includes using a least squares estimator between the tie points and the associated 3D points in the first and second 3D images.

In Example 14, at least one of Examples 10-13 can further include, wherein the tie points include respective tie point errors and reducing the sum aggregate of discrepancies is further determined based on the tie point errors.

In Example 15, at least one of Examples 10-14 can further include, wherein the error of the registered 3D images is an improvement over the initial errors of the first 3D image and the second 3D image.

Example 16 can include a memory including first and second three-dimensional (3D) images of first and second geographical regions stored thereon, and processing circuitry coupled to the memory, the processing circuitry configured to reduce a sum aggregate of discrepancies between respective tie points and associated 3D points in the first and the second 3D images, adjust 3D error models of the first and second 3D images based on the reduced discrepancies to generate registered 3D images, and propagate an error of the first or second 3D images to the registered 3D image to generate error of the registered 3D images.

In Example 17, Example 16 can further include, wherein the processing circuitry is further configured to reduce the discrepancies by folding ground points associated with the tie points into a representation of the first and second 3D images.

In Example 18, Example 17 can further include, wherein the processing circuitry is further configured to unfold corrections to the ground points from the representation.

In Example 19, at least one of Examples 16-18 can further include, wherein the first 3D image and the second 3D image are views of first and second geographical regions, respectively, that overlap.

In Example 20, at least one of Examples 16-19 can further include, wherein the processing circuitry is further configured to condition the error of the first and second 3D images before propagating the error and wherein the conditioned error includes errors in translation in x, errors in translation in y, errors in translation in z, errors in roll, errors in yaw, errors in pitch, and errors in scale between the first and second images.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for registering a first three-dimensional (3D) image to a second 3D image with error propagation, the method comprising:
   iteratively reducing, based on respective iterative adjustments to tie points, a sum aggregate of discrepancies between respective tie points and associated 3D points in the first and the second 3D images, each tie point of the tie points indicating a 3D location on a ground surface, a corresponding 3D point in the first 3D image and a corresponding 3D point in the second 3D image;
   adjusting 3D error models of the first and second 3D images based on the reduced sum aggregate to generate registered 3D images; and
   propagating the adjusted error models of the first or second 3D images to the registered 3D image to generate error of the registered 3D images.

2. The method of claim 1, further comprising conditioning the error of the first and second 3D images before propagating the error.

3. The method of claim 2, wherein the conditioned error includes errors in translation in x, errors in translation in y, errors in translation in z, errors in roll, errors in yaw, errors in pitch, and errors in scale between the first and second images.

4. The method of claim 1, wherein reducing the sum aggregate of discrepancies includes using a least squares estimator between the tie points and the associated 3D points in the first and second 3D images.

5. The method of claim 1, wherein the tie points include respective tie point errors and reducing the sum aggregate of discrepancies is further determined based on the tie point errors.

6. The method of claim 1, wherein the error of the registered 3D images is an improvement over initial errors of the first 3D image and the second 3D image.

7. The method of claim 1, wherein reducing the sum aggregate includes folding ground points associated with the tie points into a representation of the first and second 3D images.

8. The method of claim 7, further comprising unfolding corrections to the ground points from the representation.

9. The method of claim 1, wherein the first 3D image and the second 3D image are views of first and second geographical regions, respectively, that overlap.

10. A non-transitory machine-readable medium including instructions that, when executed by a machine, cause a machine to perform operations for registering a first three-dimensional (3D) image to a second 3D image with error propagation, the operations comprising:
    iteratively reducing, based on respective iterative adjustments to tie points, a sum aggregate of discrepancies between respective tie points and associated 3D points in the first and the second 3D images, each tie point of the tie points indicating a 3D location on a ground surface, a corresponding 3D point in the first 3D image and a corresponding 3D point in the second 3D image;
    adjust 3D error models of the first and second 3D images based on the reduced sum aggregate to generate registered 3D images; and
    propagating the adjusted error models of the first or second 3D images to the registered 3D image to generate error of the registered 3D images.

11. The non-transitory machine-readable medium of claim 10, wherein the operations further comprise conditioning the error of the first and second 3D images before propagating the error.

12. The non-transitory machine-readable medium of claim 11, wherein the conditioned error includes errors in translation in x, errors in translation in y, errors in translation in z, errors in roll, errors in yaw, errors in pitch, and errors in scale between the first and second images.

13. The non-transitory machine-readable medium of claim 10, wherein reducing the sum aggregate of discrepancies includes using a least squares estimator between the tie points and the associated 3D points in the first and second 3D images.

14. The non-transitory machine-readable medium of claim 10, wherein the tie points include respective tie point errors and reducing the sum aggregate of discrepancies is further determined based on the tie point errors.

15. The non-transitory machine-readable medium of claim 10, wherein the error of the registered 3D images is an improvement over initial errors of the first 3D image and the second 3D image.

16. A system comprising:
    a memory including first and second three-dimensional (3D) images of first and second geographical regions stored thereon;
    processing circuitry coupled to the memory, the processing circuitry configured to:
    iteratively reduce, based on respective iterative adjustments to tie points, a sum aggregate of discrepancies between respective tie points and associated 3D points in the first and the second 3D images, each tie point of the tie points indicating a 3D location on a ground surface, a corresponding 3D point in the first 3D image and a corresponding 3D point in the second 3D image;
    adjust 3D error models of the first and second 3D images based on the reduced sum aggregate to generate registered 3D images; and
    propagate the adjusted error models of the first or second 3D images to the registered 3D image to generate error of the registered 3D images.

17. The system of claim 16, wherein the processing circuitry is further configured to reduce the sum aggregate by folding ground points associated with the tie points into a representation of the first and second 3D images.

18. The system of claim 17, wherein the processing circuitry is further configured to unfold corrections to the ground points from the representation.

19. The system of claim 16, wherein the first 3D image and the second 3D image are views of first and second geographical regions, respectively, that overlap.

20. The system of claim 16, wherein the processing circuitry is further configured to condition the error of the first and second 3D images before propagating the error and wherein the conditioned error includes errors in translation in x, errors in translation in y, errors in translation in z, errors in roll, errors in yaw, errors in pitch, and errors in scale between the first and second images.

* * * * *